United States Patent
Matsushita

(10) Patent No.: US 10,156,713 B2
(45) Date of Patent: Dec. 18, 2018

(54) WAVELENGTH VARIABLE INTERFERENCE FILTER HAVING SPECIFIED PEAK CENTER WAVELENGTH REFLECTION CHARACTERISTICS, ELECTRONIC DEVICE HAVING SUCH FILTER, AND METHOD OF DESIGNING AND MANUFACTURING SUCH FILTER

(71) Applicant: Seiko Epson Corporation, Tokyo (JP)

(72) Inventor: Tomonori Matsushita, Chino (JP)

(73) Assignee: Seiko Epson Corporation (JP)

( * ) Notice: Subject to any disclaimer, the term of this patent is extended or adjusted under 35 U.S.C. 154(b) by 121 days.

(21) Appl. No.: 15/285,775

(22) Filed: Oct. 5, 2016

(65) Prior Publication Data
US 2017/0102535 A1    Apr. 13, 2017

(30) Foreign Application Priority Data
Oct. 8, 2015   (JP) ................. 2015-200276

(51) Int. Cl.
| | |
|---|---|
| *G02B 26/00* | (2006.01) |
| *G02B 27/00* | (2006.01) |
| *G01J 3/26* | (2006.01) |
| *G02B 5/28* | (2006.01) |

(52) U.S. Cl.
CPC ....... *G02B 26/001* (2013.01); *G02B 27/0012* (2013.01); *G01J 3/26* (2013.01); *G02B 5/285* (2013.01)

(58) Field of Classification Search
CPC .......... B81B 3/0018; B81B 2203/04; B81B 2203/0323; B81B 2203/033; B81B 2203/0338; B81B 2203/0346; G02B 5/28–5/289; G02B 6/29358; G02B 26/00; G02B 26/001; G02B 26/002; G02B 26/007; G01J 3/0208; G01J 3/0264; G01J 3/26;
(Continued)

(56) References Cited

U.S. PATENT DOCUMENTS

| | | | |
|---|---|---|---|
| 2012/0044492 A1 | 2/2012 | Matsushita et al. | |
| 2017/0192144 A1* | 7/2017 | Ooi | .......... G02B 5/281 |

FOREIGN PATENT DOCUMENTS

| | | |
|---|---|---|
| JP | H11-142752 A | 5/1999 |
| JP | 2012-042784 A | 3/2012 |

* cited by examiner

*Primary Examiner* — Stephone B Allen
*Assistant Examiner* — Ryan S Dunning
(74) *Attorney, Agent, or Firm* — Harness, Dickey & Pierce, P.L.C.

(57) ABSTRACT

A wavelength variable interference filter includes a fixed reflection film, a movable reflection film, and an actuator that changes a gap between the films. A wavelength of output light is first wavelength $\lambda\alpha$. A center wavelength in a target wavelength region is measurement center wavelength $\lambda 0$. A peak center wavelength in reflection characteristics of the movable reflection film is first center wavelength $\lambda 1$. A peak center wavelength in reflection characteristics of the fixed reflection film is second center wavelength $\lambda 2$. The gap between the films when light of the first wavelength $\lambda\alpha$ is transmitted is $d\alpha(\lambda 1, \lambda 2)$. When a pair of optical films face each other, a center wavelength in reflection characteristics of the pair is the measurement center wavelength $\lambda 0$, and the light of the first wavelength $\lambda\alpha$ is outputted, the gap between the pair of optical films is $d\alpha(\lambda 0, \lambda 0)$. Further, $d\alpha(\lambda 1, \lambda 2) < d\alpha(\lambda 0, \lambda 0)$.

13 Claims, 12 Drawing Sheets

(58) Field of Classification Search
CPC .......... G01J 3/42; G01J 3/51; G01J 2003/262;
G01J 2003/265; G01J 2003/267
USPC .............. 216/13, 17, 18; 356/300, 326, 402,
356/450–521; 359/260, 359, 577–590,
359/850, 885
See application file for complete search history.

FIG. 6

MAXIMUM GAP (nm)

| | | SECOND CENTER WAVELENGTH λ2 (nm) | | | | |
|---|---|---|---|---|---|---|
| | | 950 | 1050 | 1150 | 1250 | 1350 |
| FIRST CENTER WAVELENGTH λ1 (nm) | 950 | 746.7 | 670.9 | 606.6 | 553.5 | 508.8 |
| | 1050 | | 598.7 | 530.9 | 477.8 | 433.1 |
| | 1150 | | | 469.8 | 413.4 | 368.7 |
| | 1250 | | | | 362.9 | 315.6 |
| | 1350 | | | | | 270.9 |

FIG. 7

MINIMUM VALUE OF HALF-VALUE WIDTH (nm)

| | | SECOND CENTER WAVELENGTH λ2 (nm) | | | | |
|---|---|---|---|---|---|---|
| | | 950 | 1050 | 1150 | 1250 | 1350 |
| FIRST CENTER WAVELENGTH λ1 (nm) | 950 | 8.5 | 7.5 | 7.5 | 8.0 | 9.6 |
| | 1050 | | 6.4 | 6.3 | 6.8 | 8.2 |
| | 1150 | | | 6.0 | 6.5 | 7.7 |
| | 1250 | | | | 6.9 | 7.8 |
| | 1350 | | | | | 8.2 |

FIG. 8

MAXIMUM VALUE OF HALF-VALUE WIDTH (nm)

| | | SECOND CENTER WAVELENGTH λ2 (nm) | | | | |
|---|---|---|---|---|---|---|
| | | 950 | 1050 | 1150 | 1250 | 1350 |
| FIRST CENTER WAVELENGTH λ1 (nm) | 950 | 13.8 | 11.7 | 11.2 | 11.1 | 11.6 |
| | 1050 | | 9.4 | 8.9 | 8.7 | 9.1 |
| | 1150 | | | 7.8 | 7.8 | 8.5 |
| | 1250 | | | | 7.4 | 9.2 |
| | 1350 | | | | | 11.5 |

FIG. 9

MINIMUM VALUE OF TRANSMITTANCE

| | | SECOND CENTER WAVELENGTH λ2 (nm) | | | | |
|---|---|---|---|---|---|---|
| | | 950 | 1050 | 1150 | 1250 | 1350 |
| FIRST CENTER WAVELENGTH λ1 (nm) | 950 | 0.58 | 0.53 | 0.49 | 0.51 | 0.54 |
| | 1050 | | 0.51 | 0.51 | 0.55 | 0.58 |
| | 1150 | | | 0.53 | 0.56 | 0.60 |
| | 1250 | | | | 0.59 | 0.61 |
| | 1350 | | | | | 0.64 |

FIG. 10

MAXIMUM VALUE OF TRANSMITTANCE

| | | SECOND CENTER WAVELENGTH λ2 (nm) | | | | |
|---|---|---|---|---|---|---|
| | | 950 | 1050 | 1150 | 1250 | 1350 |
| FIRST CENTER WAVELENGTH λ1 (nm) | 950 | 0.69 | 0.63 | 0.55 | 0.54 | 0.65 |
| | 1050 | | 0.62 | 0.57 | 0.56 | 0.62 |
| | 1150 | | | 0.58 | 0.57 | 0.61 |
| | 1250 | | | | 0.62 | 0.65 |
| | 1350 | | | | | 0.73 |

FIG. 11

DRIVE AMOUNT (nm)

| | | SECOND CENTER WAVELENGTH λ2 (nm) | | | | |
|---|---|---|---|---|---|---|
| | | 950 | 1050 | 1150 | 1250 | 1350 |
| FIRST CENTER WAVELENGTH λ1 (nm) | 950 | 199.0 | 188.4 | 175.8 | 165.7 | 160.9 |
| | 1050 | | 180.4 | 165.2 | 155.1 | 150.3 |
| | 1150 | | | 155.3 | 142.6 | 137.8 |
| | 1250 | | | | 134.6 | 127.7 |
| | 1350 | | | | | 122.8 |

WAVELENGTH VARIABLE INTERFERENCE FILTER HAVING SPECIFIED PEAK CENTER WAVELENGTH REFLECTION CHARACTERISTICS, ELECTRONIC DEVICE HAVING SUCH FILTER, AND METHOD OF DESIGNING AND MANUFACTURING SUCH FILTER

BACKGROUND

1. Technical Field

The present invention relates to a wavelength variable interference filter, an electronic device, a method of designing a wavelength variable interference filter, and a method of manufacturing a wavelength variable interference filter, etc.

2. Related Art

A Fabry-Perot etalon interference filter that includes a pair of reflection films facing each other (hereinafter simply referred to as "interference filter") is known (for example, refer to JP-A-2012-042784). In the interference filter disclosed in JP-A-2012-042784, it is made easier to design the spectral characteristics of the interference filter by making the reflection characteristics of a first optical film, which is one of a pair of reflection films, and the reflection characteristics of a second optical film, which is the other of the pair, asymmetrical to each other. Specifically, each of these optical films is designed such that the center wavelength $\lambda 3$ of transmitted light that passes through the interference filter will be within a range between the peak center wavelength $\lambda 4$ in the reflection characteristics of the first optical film (hereinafter simply referred to as reflection center wavelength) and the reflection center wavelength $\lambda 5$ of the second optical film ($\lambda 4 < \lambda 3 < \lambda 5$).

A wavelength variable interference filter that is capable of changing the wavelengths of light outputted (transmitted or reflected) by changing the dimension of a gap between a pair of reflection films is known as such an interference filter. In such a wavelength variable interference filter, in order to output light that has desired wavelengths, it is necessary to control the dimension of the gap between the pair of reflection films with high precision. However, for example, when feedback control is performed on the dimension of the gap between the reflection films, the greater the dimension of the gap between the reflection films, the greater the variations in the gap dimension (poorer driving reproducibility). In the interference filter disclosed in JP-A-2012-042784 mentioned above, in order to make it easier to design the spectral characteristics of the interference filter, the reflection center wavelength of each of the optical films (reflection films) is designed. However, driving reproducibility based on the gap dimension is not considered. For this reason, even if the interference filter disclosed in JPA-2012-042784 is applied to a wavelength variable interference filter, it is not possible to improve driving reproducibility.

SUMMARY

An advantage of some aspects of the invention is to provide a wavelength variable interference filter that has high driving reproducibility, an electronic device, a method of designing such a wavelength variable interference filter, and a method of manufacturing such a wavelength variable interference filter.

A wavelength variable interference filter according to an application example of the invention is a filter capable of changing a wavelength of output light within a predetermined wavelength region, comprising: a first reflection film; a second reflection film facing the first reflection film; and a gap changing unit that changes dimension of a gap between the first reflection film and the second reflection film, wherein a wavelength of the output light is defined as first wavelength $\lambda\alpha$, wherein a center wavelength in the predetermined wavelength region is defined as measurement center wavelength $\lambda 0$, wherein a peak center wavelength in reflection characteristics of the first reflection film is defined as first center wavelength $\lambda 1$, wherein a peak center wavelength in reflection characteristics of the second reflection film is defined as second center wavelength $\lambda 2$, wherein the dimension of the gap between the first reflection film and the second reflection film in a case where light of the first wavelength $\lambda\alpha$ is outputted from the wavelength variable interference filter is defined as $d\alpha(\lambda 1, \lambda 2)$, wherein, in a case where two optical films that make up a pair are provided in such a way as to face each other, where a center wavelength in reflection characteristics of the pair is the measurement center wavelength $\lambda 0$, and where the light of the first wavelength $\lambda\alpha$ is outputted, dimension of a gap between the two optical films making up the pair is defined as $d\alpha(\lambda 0, \lambda 0)$, and wherein $d\alpha(\lambda 1, \lambda 2) < d\alpha(\lambda 0, \lambda 0)$ is satisfied.

In this application example, the dimension $d\alpha(\lambda 1, \lambda 2)$ of the gap between the first reflection film and the second reflection film in a case where light of the first wavelength $\lambda\alpha$ is outputted from the wavelength variable interference filter is less than the dimension $d\alpha(\lambda 0, \lambda 0)$ of the gap between the pair of optical films in a case where light of the first wavelength $\lambda\alpha$ is outputted by means of the interference filter using the pair of optical films, the center wavelength in the reflection characteristics of which is the measurement center wavelength $\lambda 0$. That is, in a case where optical films the center wavelength in the reflection characteristics of which is the measurement center wavelength $\lambda 0$ are used as the first reflection film and the second reflection film of the wavelength variable interference filter, the dimension of the gap between the first reflection film and the second reflection film for outputting light of the first wavelength $\lambda\alpha$ will be $d\alpha(\lambda 0, \lambda 0)$. In this application example, as stated above, the dimension $d\alpha(\lambda 1, \lambda 2)$ of the gap between the first reflection film and the second reflection film for outputting light of the first wavelength $\lambda\alpha$ is less than the dimension $d\alpha(\lambda 0, \lambda 0)$ of the gap in the prior-art structure mentioned above. That is, the dimension of the gap when light of the first wavelength $\lambda\alpha$ is outputted from the wavelength variable interference filter decreases, and it is possible to reduce variations in the gap dimension. For this reason, driving reproducibility improves. The improved driving reproducibility reduces variations in the wavelengths of light outputted from the wavelength variable interference filter, thereby making it possible to output light of desired wavelengths from the wavelength variable interference filter with high precision (resulting in an improvement in spectral precision of the wavelength variable interference filter).

Preferably, in the wavelength variable interference filter according to the above application example, the first wavelength $\lambda\alpha$ should be a minimum wavelength in the predetermined wavelength region. In the above application example, the first wavelength $\lambda\alpha$ is the minimum wavelength $\lambda s$ in the wavelength region of light outputted from the wavelength variable interference filter. That is, the gap dimension $ds(\lambda 1, \lambda 2)$ when outgoing light of the minimum wavelength $\lambda s$ is outputted from the wavelength variable interference filter is less than the gap dimension $ds(\lambda 1, \lambda 2)$ when outgoing light of the minimum wavelength $\lambda s$ is outputted by means of the interference filter using the pair of optical films, the center wavelength in the reflection characteristics of which is the measurement center wavelength $\lambda 0$. In a case where output light goes out of the wavelength variable interference filter in the same order, the gap dimension is the smallest when light of the minimum wavelength $\lambda s$ is outputted. In addition, there is a proportional relationship between the wavelength of the output light and the dimension of the gap. Therefore, if the first wavelength $\lambda \alpha$ is the minimum wavelength $\lambda s$ as in the above application example, $d\alpha(\lambda 1, \lambda 2)<d\alpha(\lambda 0, \lambda 0)$ is satisfied for each wavelength in the measurement wavelength region. This improves, as in the above application example, driving reproducibility and spectral precision of the wavelength variable interference filter.

Preferably, in the wavelength variable interference filter according to the above application example, the first center wavelength $\lambda 1$ and the second center wavelength $\lambda 2$ should satisfy $\lambda 1 \geq \lambda 0$, and $\lambda 2 > \lambda 0$. In this preferred example, the first center wavelength $\lambda 1$ is longer than or equal to the measurement center wavelength $\lambda 0$, and the second center wavelength $\lambda 2$ is longer than the measurement center wavelength $\lambda 0$. In this case, it is possible to further reduce the dimension of the gap between the first reflection film and the second reflection film when light of each wavelength is outputted from the wavelength variable interference filter, resulting in an improvement in driving reproducibility.

Preferably, in the wavelength variable interference filter according to the above application example, the first reflection film and the second reflection film should be dielectric multilayer films. In this preferred example, dielectric multilayer films are used as the first reflection film and the second reflection film. Therefore, for example, as compared with a case where metal films are used as the first reflection film and the second reflection film, it is possible to make the half-value width of output light of the wavelength variable interference filter narrower and to output the light with higher resolution.

Preferably, the wavelength variable interference filter according to the above example should further comprise: a first substrate on which the first reflection film is formed, wherein the gap changing unit should change the dimension of the gap by giving rise to displacement of the first substrate toward the second reflection film; and wherein the first center wavelength $\lambda 1$ and the second center wavelength $\lambda 2$ should satisfy $\lambda 1 < \lambda 2$. In this preferred example, the gap changing unit changes the dimension of the gap by giving rise to displacement of the substrate on which the first reflection film is formed toward the second reflection film (for example, by causing the substrate to sag toward the second reflection film). In addition, the first center wavelength $\lambda 1$ of the first reflection film is shorter than the second center wavelength $\lambda 2$ of the second reflection film. In a structure in which, as in this preferred example, the gap dimension is changed by giving rise to displacement of the substrate toward the second reflection film, preferably, the thickness of the substrate should be reduced to make the displacement of the substrate easier. However, if the thickness of the substrate is reduced, there is a possibility that the deformation or warping of the substrate might occur due to the membrane stress of the first reflection film. In this respect, in this preferred example, $\lambda 1 < \lambda 2$ is satisfied. That is, the thickness of each constituent dielectric film of the first reflection film is less than the thickness of each constituent dielectric film of the second reflection film, and the thickness of the first reflection film is also less than the thickness of the second reflection film. Such a structure realizes a reduction in the membrane stress of the first reflection film, thereby suppressing the deformation or warping of the substrate.

An electronic device according to an application example comprises: the wavelength variable interference filter described above; and a control unit that controls the wavelength variable interference filter described above. In this application example, as in the above application example, it is possible to improve the driving reproducibility of the wavelength variable interference filter. Therefore, when the dimension of the gap between the first reflection film and the second reflection film in the wavelength variable interference filter is controlled by the control unit, it is possible to set it into a desired gap dimension and, therefore, it is possible to output light of wavelengths dependent upon the gap dimension from the wavelength variable interference filter with high precision.

A method according to an application example of the invention is a method of designing a wavelength variable interference filter, the wavelength variable interference filter being capable of changing a wavelength of output light within a predetermined wavelength region and including a first reflection film, a second reflection film facing the first reflection film, and a gap changing unit that changes dimension of a gap between the first reflection film and the second reflection film, comprising: designing the first reflection film and the second reflection film; wherein a wavelength of the output light is defined as first wavelength $\lambda \alpha$, wherein a center wavelength in the predetermined wavelength region is defined as measurement center wavelength $\lambda 0$, wherein a peak center wavelength in reflection characteristics of the first reflection film is defined as first center wavelength $\lambda 1$, wherein a peak center wavelength in reflection characteristics of the second reflection film is defined as second center wavelength $\lambda 2$, wherein the dimension of the gap between the first reflection film and the second reflection film in a case where light of the first wavelength $\lambda \alpha$ is outputted from the wavelength variable interference filter is defined as $d\alpha(\lambda 1, \lambda 2)$, wherein, in a case where two optical films that make up a pair are provided in such a way as to face each other, where a center wavelength in reflection characteristics of the pair is the measurement center wavelength $\lambda 0$, and where the light of the first wavelength $\lambda \alpha$ is outputted, dimension of a gap between the two optical films making up the pair is defined as $d\alpha(\lambda 0, \lambda 0)$, and wherein the first reflection film and the second reflection film are designed in such a way that the first center wavelength $\lambda 1$ and the second center wavelength $\lambda 2$ satisfy $d\alpha(\lambda 1, \lambda 2)<d\alpha(\lambda 0, \lambda 0)$.

In this application example, the wavelength variable interference filter is designed in such a way that the first center wavelength $\lambda 1$ of the first reflection film and the second center wavelength $\lambda 2$ of the second reflection film satisfy $d\alpha(\lambda 1, \lambda 2)<d\alpha(\lambda 0, \lambda 0)$. Therefore, similarly to the wavelength variable interference filter described above, it is possible to decrease the dimension of the gap when light of the first wavelength $\lambda \alpha$ is outputted from the wavelength variable interference filter and, therefore, it is possible to reduce variations in the gap dimension. Therefore, it is possible to realize high driving reproducibility in a wavelength variable interference filter designed by using this design method. As a result, it is possible to improve spectral precision of the wavelength variable interference filter.

A method according to an application example of the invention is a method of manufacturing a wavelength variable interference filter, the wavelength variable interference filter being capable of changing a wavelength of output light within a predetermined wavelength region and including a first reflection film, a second reflection film facing the first reflection film, and a gap changing unit that changes dimension of a gap between the first reflection film and the second reflection film, comprising: a first process of forming the first reflection film; and a second process of forming the second reflection film, wherein a wavelength of the output light is defined as first wavelength $\lambda\alpha$, wherein a center wavelength in the predetermined wavelength region is defined as measurement center wavelength $\lambda 0$, wherein a peak center wavelength in reflection characteristics of the first reflection film is defined as first center wavelength $\lambda 1$, wherein a peak center wavelength in reflection characteristics of the second reflection film is defined as second center wavelength $\lambda 2$, wherein the dimension of the gap between the first reflection film and the second reflection film in a case where light of the first wavelength $\lambda\alpha$ is outputted from the wavelength variable interference filter is defined as $d\alpha(\lambda 1, \lambda 2)$, wherein, in a case where two optical films that make up a pair are provided in such a way as to face each other, where a center wavelength in reflection characteristics of the pair is the measurement center wavelength $\lambda 0$, and where the light of the first wavelength $\lambda\alpha$ is outputted, dimension of a gap between the two optical films making up the pair is defined as $d\alpha(\lambda 0, \lambda 0)$, wherein, in the first process, the first reflection film is manufactured in such a way that the first center wavelength $\lambda 1$ satisfies $d\alpha(\lambda 1, \lambda 2)<d\alpha(\lambda 0, \lambda 0)$, and wherein, in the second process, the second reflection film is manufactured in such a way that the second center wavelength $\lambda 2$ satisfies $d\alpha(\lambda 1, \lambda 2)<d\alpha(\lambda 0, \lambda 0)$.

In this application example, the wavelength variable interference filter is manufactured by forming the first reflection film and the second reflection film in such a way that the first center wavelength $\lambda 1$ of the first reflection film and the second center wavelength $\lambda 2$ of the second reflection film satisfy $d\alpha(\lambda 1, \lambda 2)<d\alpha(\lambda 0, \lambda 0)$. Therefore, similarly to the wavelength variable interference filter described above, it is possible to decrease the dimension of the gap when light of the first wavelength $\lambda\alpha$ is outputted from the wavelength variable interference filter and, therefore, it is possible to reduce variations in the gap dimension. Therefore, it is possible to realize high driving reproducibility in a wavelength variable interference filter manufactured by using this manufacturing method. As a result, it is possible to improve spectral precision of the wavelength variable interference filter.

BRIEF DESCRIPTION OF THE DRAWINGS

The invention will be described with reference to the accompanying drawings, wherein like numbers reference like elements.

FIG. 6 is a table that shows, for each combination of the first center wavelength $\lambda 1$ and the second center wavelength $\lambda 2$, required dimension of the gap between the reflection films that is necessary for allowing light of the maximum wavelength in the target wavelength region to be transmitted through the wavelength variable interference filter as a peak wavelength.

FIG. 7 is a table that shows, for each combination of the first center wavelength and the second center wavelength, the minimum value of the half-value width of transmitted light passing through the wavelength variable interference filter.

FIG. 8 is a table that shows, for each combination of the first center wavelength and the second center wavelength, the maximum value of the half-value width of transmitted light passing through the wavelength variable interference filter.

FIG. 9 is a table that shows, for each combination of the first center wavelength and the second center wavelength, the minimum value of the transmittance of transmitted light passing through the wavelength variable interference filter.

FIG. 10 is a table that shows, for each combination of the first center wavelength and the second center wavelength, the maximum value of the transmittance of transmitted light passing through the wavelength variable interference filter.

FIG. 11 is a table that shows, for each combination of the first center wavelength and the second center wavelength, a drive amount when wavelength scanning is performed for the target wavelength region.

DESCRIPTION OF EXEMPLARY EMBODIMENTS

First Embodiment

With reference to the accompanying drawings, a wavelength variable interference filter according to a first embodiment of the present invention will now be explained.

Structure of Wavelength Variable Interference Filter

Figure 1:
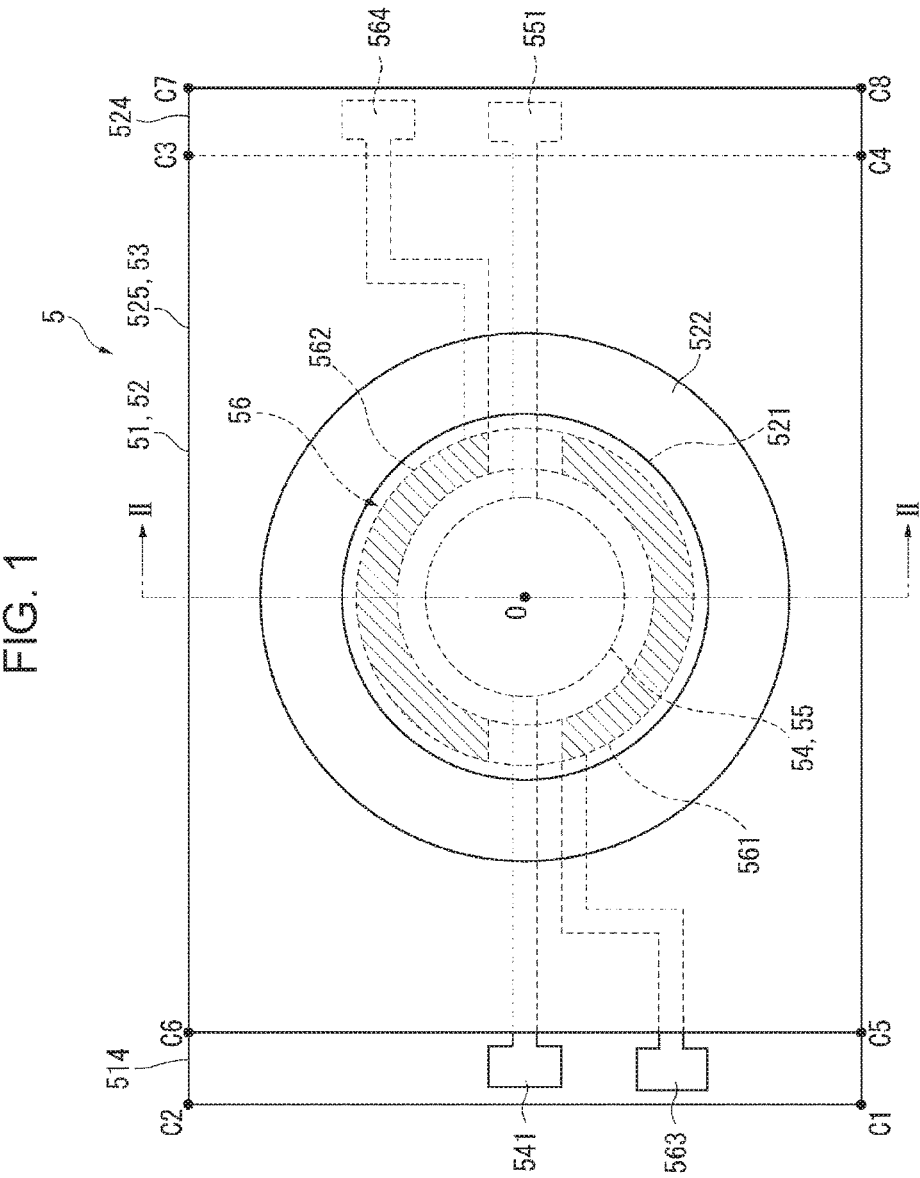
FIG. 1 is a plan view that illustrates the schematic structure of a wavelength variable interference filter according to a first embodiment of the present invention.
Figure 2:
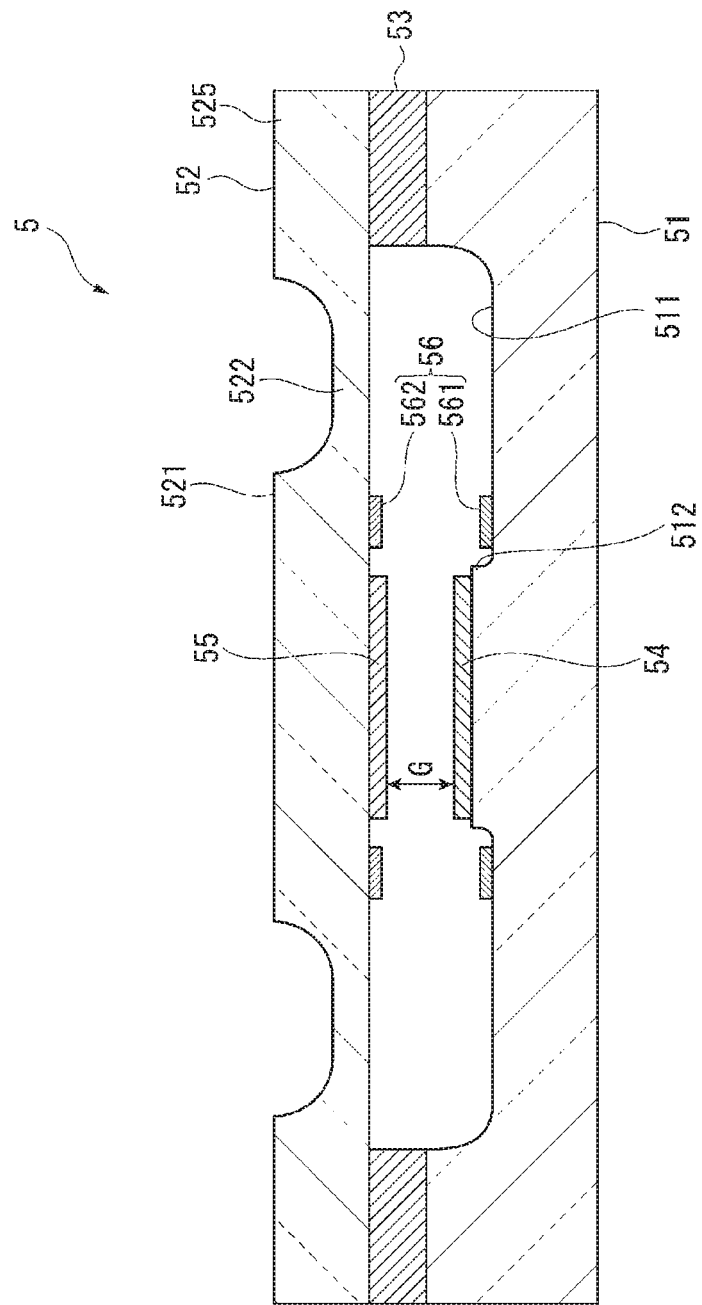
FIG. 2 is a sectional view of the wavelength variable interference filter taken along the line II-II of FIG. 1.

FIG. 1 is a plan view that illustrates the schematic structure of a wavelength variable interference filter 5 according to a first embodiment. FIG. 2 is a sectional view of the wavelength variable interference filter 5 taken along the line II-II of FIG. 1. As illustrated in FIGS. 1 and 2, the wavelength variable interference filter 5 includes a light-transmissive fixed substrate 51 and a light-transmissive movable substrate 52. The fixed substrate 51 and the movable substrate 52 are made of, for example, soda glass, crystalline glass, silica glass, lead glass, potassium glass, borosilicate glass, alkali-free glass, or other various kinds of glass, quartz, or the like. The fixed substrate 51 and the movable substrate 52 are formed as a single integrated substrate body by being joined to each other by means of a junctional membrane 53. The junctional membrane 53 is, for example, made of a plasma polymer film, etc. whose chief ingredient is siloxane.

The fixed substrate 51 has a surface oriented toward the movable substrate 52 (movable-substrate-side surface). A fixed reflection film 54, which is an example of a second reflection film according to the invention, is formed on the movable-substrate-side surface of the fixed substrate 51. The movable substrate 52 has a surface oriented toward the fixed substrate 51 (fixed-substrate-side surface). A movable reflection film 55, which is an example of a first reflection film according to the invention, is formed on the fixed-substrate-side surface of the movable substrate 52. The fixed reflection film 54 and the movable reflection film 55 face each other. There is a gap G between these two films. The wavelength variable interference filter 5 is provided with an electrostatic actuator 56, which is used for adjusting (changing) the value of the gap G (gap dimension). The electrostatic actuator 56 is an example of a gap changing unit according to the invention. The electrostatic actuator 56 includes a fixed electrode 561, which is provided on the fixed substrate 51, and a movable electrode 562, which is provided on the movable substrate 52. In the description below, plan view taken in the substrate thickness direction of the fixed substrate 51 or the movable substrate 52, that is, the view of the wavelength variable interference filter 5 in plan in the film thickness direction of the fixed reflection film 54 and the movable reflection film 55, is referred to as "filter plan view". In the present embodiment, in filter plan view, the center of the fixed reflection film 54 and the center of the movable reflection film 55 coincide with each other. The center of the reflection films 54 and 55 in filter plan view is denoted as O.

Structure of Fixed Substrate

As illustrated in FIG. 2, the fixed substrate 51 has an electrode providing groove 511, which is formed by, for example, etching, and a reflection film providing region 512. One edge region (side C1-C2 in FIG. 1) of the fixed substrate 51 is a protruding region located outside the corresponding edge (side C5-C6 in FIG. 1) of the movable substrate 52. The protruding region is formed as a first terminal take-out region 514.

In filter plan view, the electrode providing groove 511 has a ring shape the center of which is the filter center point O of the fixed substrate 51. The reflection film providing region 512 is raised toward the movable substrate 52 from the center region encircled by the electrode providing groove 511 in filter plan view. The fixed electrode 561 of the electrostatic actuator 56 is provided on the bottom surface of the electrode providing groove 511. The fixed reflection film 54 is provided on the raised surface of the reflection film providing region 512. The fixed substrate 51 has an electrode lead-out groove (not illustrated) that extends from the electrode providing groove 511 toward the periphery of the fixed substrate 51.

The fixed electrode 561 has a shape of, for example, a broken ring (looking similar to the letter C). As illustrated in FIG. 1, at a partial region that is relatively near the side C1-C2, there is a gap opening that makes it look like the letter C. An insulation film for ensuring insulation between the fixed electrode 561 and the movable electrode 562 may be formed on the fixed electrode 561. The fixed electrode 561 has a fixed lead-out electrode 563 for extension to the first terminal take-out region 514 along the electrode lead-out groove.

Figure 3:
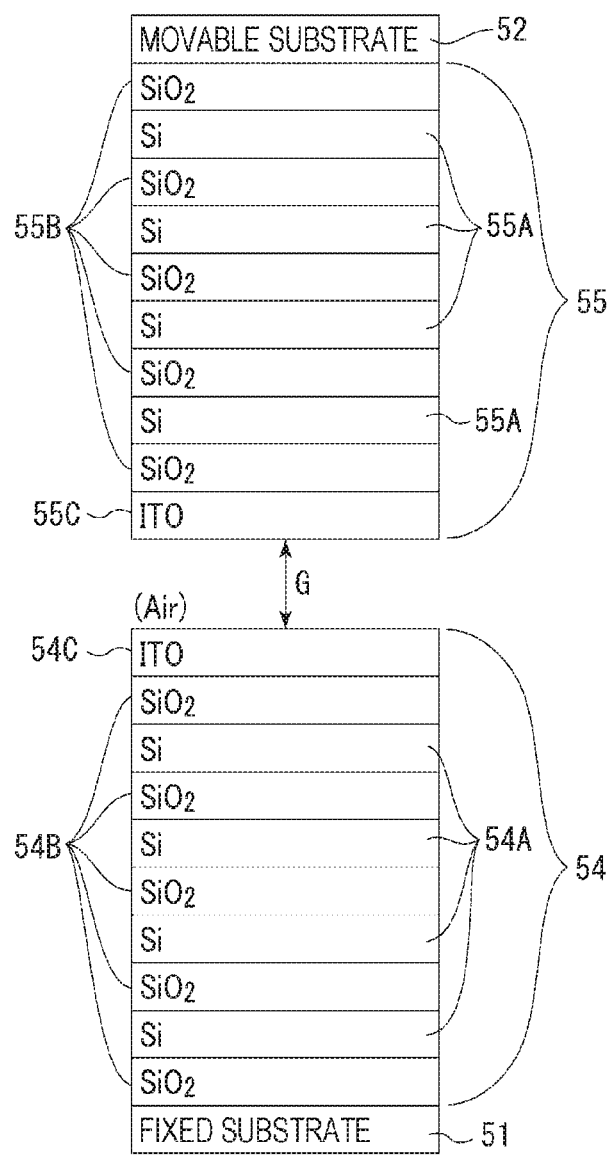
FIG. 3 is a diagram that illustrates the schematic structure of a fixed reflection film and a movable reflection film according to the embodiment.

As illustrated in FIG. 2, the reflection film providing region 512 is raised toward the movable substrate 52 from the center region encircled by the electrode providing groove 511. The fixed reflection film 54 is provided on the raised surface of the reflection film providing region 512. FIG. 3 is a schematic diagram that illustrates the film structure of the fixed reflection film 54 and the movable reflection film 55. As illustrated in FIG. 3, the fixed reflection film 54 is a dielectric multilayer film that has an alternate stack structure made up of high refractive layers 54A (for example, Si layers) and low refractive layers 54B (for example, $SiO_2$ layers). With such a dielectric multilayer film structure, it is possible to produce an optical film that has desired reflection characteristics by controlling the thickness of each high refractive layer and each low refractive layer. A detailed explanation of the optical characteristics (reflection characteristics) of the fixed reflection film 54 will be given later.

The top surface layer in the multilayered fixed reflection film 54, that is, the layer facing the movable substrate 52, is a conductive film 54C, which is made of an electrode material, for example, ITO. The film thickness t of ITO is: t=30 nm. A reflection film that has high reflection characteristics over a wide wavelength region, for example, a reflection film made of Ag alloy, may be used as the conductive film.

A first detection electrode 541 is provided on the fixed substrate 51. As illustrated in FIG. 1, the first detection electrode 541 is connected to the rim of the fixed reflection film 54 (conductive film 54C) and extends through the C opening of the fixed electrode 561 toward the first terminal take-out region 514. The first detection electrode 541 and the fixed reflection film 54 are formed at the same time in a simultaneous film-forming process.

Structure of Movable Substrate

The movable substrate 52 is an example of a substrate according to the invention. A part of the movable substrate 52 (movable region 521) sags toward the fixed substrate 51 when a force of electrostatic attraction is applied by the electrostatic actuator 56. As a result, the dimension of the gap between the fixed reflection film 54 and the movable reflection film 55 changes. In filter plan view of FIG. 1, the movable substrate 52 includes the movable region 521, for example, a circular movable region the center of which is the filter center point O, a supporting region 522, which is concentric with the movable region 521 and supports the movable region 521, and a peripheral substrate region 525, which is located outside the supporting region 522. As illustrated in FIG. 1, one edge region (side C7-C8 in FIG. 1) of the movable substrate 52 is a protruding region located outside the corresponding edge (side C3-C4 in FIG. 1) of the fixed substrate 51. The protruding region is formed as a second terminal take-out region 524.

As illustrated in FIG. 2, the thickness of the movable region 521 is greater than that of the supporting region 522. For example, in the present embodiment, the movable region 521 has the same thickness as that of the movable substrate 52. In filter plan view, the movable region 521 has, at least, a diameter that is greater than the rim-to-rim diameter of the reflection film providing region 512. The movable reflection film 55 and the movable electrode 562 are provided on the movable region 521.

The movable electrode 562 is provided outside the movable reflection film 55 in filter plan view, and faces the fixed electrode 561 with a gap therebetween. The movable electrode 562 has a shape of a broken ring (looking similar to the letter C). As illustrated in FIG. 1, at a partial region that is relatively near the side C7-C8, there is a gap opening that makes it look like the letter C. As mentioned in the description of the fixed electrode 561, an insulation film may be formed on the movable electrode 562. As illustrated in FIG. 1, in filter plan view, the arc areas where the fixed electrode 561 and the movable electrode 562 overlap with each other (the areas of diagonally-right-up hatched lines in FIG. 1) constitute the electrostatic actuator 56. As illustrated in FIG. 1, in filter plan view, the electrostatic actuator 56 has a point-symmetric shape and a point-symmetric layout with respect to the filter center point O. Therefore, electrostatic attraction that is exerted when a voltage is applied to the electrostatic actuator 56 acts point-symmetrically with respect to the filter center point O. This makes it possible to, in a well-balanced manner, give rise to the displacement of the movable region 521 toward the fixed substrate 51.

As illustrated in FIG. 1, a movable lead-out electrode 564 extending toward the second terminal take-out region 524 is provided for the movable electrode 562. The movable lead-out electrode 564 is provided at a groove-facing position along the electrode lead-out groove formed in the fixed substrate 51.

The movable reflection film 55 is provided at the center of the movable region 521 on the surface facing the fixed substrate 51. The movable reflection film 55 and the fixed reflection film 54 face each other with the gap G therebetween. A dielectric multilayer film that has an alternate stack structure made up of high refractive layers 55A (for example, Si layers) and low refractive layers 55B (for example, $SiO_2$ layers) as illustrated in FIG. 3 can be used as the movable reflection film 55. A detailed explanation of the optical characteristics (reflection characteristics) of the movable reflection film 55 will be given later.

The bottom surface layer in the multilayered movable reflection film 55 is a conductive film 55C, which is made of an electrode material, for example, ITO, similarly to the counterpart of the fixed reflection film 54. A second detection electrode 551 is provided on the movable substrate 52. As illustrated in FIG. 1, the second detection electrode 551 is connected to the rim of the movable reflection film 55 (conductive film 55C) and extends through the C opening of the movable electrode 562 toward the second terminal take-out region 524.

In the present embodiment, as illustrated in FIG. 2, the gap between the electrodes 561 and 562 is greater than the gap G. However, the scope of the invention is not limited to such an example. For example, if measurement target light is infrared light, depending on the measurement target wavelength region, the gap G may be greater than the gap between the electrodes 561 and 562.

The supporting region 522 is a diaphragm with which the movable region 521 is surrounded. The thickness of the supporting region 522 is less than that of the movable region 521. Therefore, the supporting region 522 is easier to yield to a deforming force than the movable region 521 is. This makes it possible to, even with weak electrostatic attraction, give rise to the displacement of the movable region 521 toward the fixed substrate 51. Since the thickness of the movable region 521 is greater than that of the supporting region 522, the rigidity of the movable region 521 is also greater than that of the supporting region 522. Therefore, even when the supporting region 522 is pulled toward the fixed substrate 51 due to electrostatic attraction, the shape of the movable region 521 is less susceptible to change. For this reason, the movable reflection film 55, which is on the movable region 521, is also less susceptible to deform, which makes it possible to keep the fixed reflection film 54 and the movable reflection film 55 always substantially in parallel with each other. Though a case where the supporting region 522 is a diaphragm is taken as an example in the present embodiment, the scope of the invention is not limited thereto. For example, beams radiating from the filter center point O at equal intervals may constitute the supporting region.

The peripheral substrate region 525 is located outside the supporting region 522 in filter plan view. The fixed-substrate-side surface of the peripheral substrate region 525 is joined to the fixed substrate 51 by means of the junctional membrane 53 provided therebetween.

In the wavelength variable interference filter 5 having the structure described above, it is possible to change the gap dimension (gap G) between the fixed reflection film 54 and the movable reflection film 55 by applying a driving voltage from the fixed lead-out electrode 563 and the movable lead-out electrode 564 respectively to the fixed electrode 561 and the movable electrode 562, which constitute the electrostatic actuator 56. In this process, with a high-frequency voltage applied between the fixed reflection film 54 (conductive film 54C) and the movable reflection film 55 (conductive film 55C) via the first detection electrode 541 and the second detection electrode 551, it is possible to measure the electrostatic capacitance between the fixed reflection film 54 and the movable reflection film 55 in terms of a capacity-to-voltage converted value. In such a structure, on the basis of the measured electrostatic capacitance, feedback control is performed on the driving voltage applied to the electrostatic actuator 56. The feedback control of the driving voltage makes it possible to control the dimension of the gap G with higher precision.

Optical Characteristics (Reflection Characteristics) of Fixed Reflection Film and Movable Reflection Film In the wavelength variable interference filter 5 described above, the wavelengths of transmitted light depend on the dimension of the gap (gap G) between the fixed reflection film 54 and the movable reflection film 55. Therefore, in order to obtain the output of light that has desired wavelengths from the wavelength variable interference filter 5, it is necessary to control the dimension of the gap G with high precision.

In the present embodiment, as described above, it is possible to measure the electrostatic capacitance between the fixed reflection film 54 and the movable reflection film 55 and perform feedback control on the driving voltage applied to the electrostatic actuator 56 on the basis of the measured electrostatic capacitance. However, in the measurement of the electrostatic capacitance between the fixed reflection film 54 and the movable reflection film 55, the same voltage value is not necessarily outputted because of a measurement error (measurement resolution). For example, even if the gap dimension is a certain fixed value, there can be variations in the electrostatic capacitance measurement value (voltage value). If the measurement result contains such a measurement error, the voltage applied to the electrostatic actuator 56 under the feedback control also varies depending on the measurement error. Therefore, the wavelengths of transmitted light going out of the wavelength variable interference filter 5 are also affected by the measurement error, resulting in wavelength fluctuations. Let d be the dimension of the gap G. Let C be electrostatic capacitance between the fixed reflection film 54 and the movable reflection film 55. Let S be the area size of the reflection film 54, 55. Let $\varepsilon_0$ be relative dielectric constant. Given these definitions, the following equation (1) holds.

$$d = \varepsilon_0 \times \frac{S}{C} \quad (1)$$

Let $\Delta C$ be a measurement error in electrostatic capacitance between the reflection films 54 and 55. Let $\Delta d$ be the amount of variation in gap dimension due to the measurement error $\Delta C$. Given these definitions, the following equation can be derived from the equation (1).

$$d + \Delta d = \varepsilon_0 \times \frac{S}{C + \Delta C} \quad (2)$$

If the measurement error $\Delta C$ is sufficiently greater than the electrostatic capacitance C in the equation (2), the following approximation (3) can be derived.

$$\Delta d \approx -d \times \frac{\Delta C}{C} \quad (3)$$

As shown in the formula (3), there are two approaches for reducing the amount of variation $\Delta d$ in the gap dimension: one is to decrease the gap dimension d, and the other is to increase the electrostatic capacitance C. Variations in the gap dimension d caused by a measurement error may be reduced by increasing the electrostatic capacitance C. However, in order to increase the electrostatic capacitance C, it is necessary to make the area S of the reflection film 54, 55 larger. In this case, it is necessary to increase the plan-view size of the wavelength variable interference filter 5. Moreover, if the area S of the reflection film 54, 55 is made larger, the reflection film 54, 55 will be more susceptible to deform. In this respect, there is a risk that the increase in the reflection film area size might result in a decrease in the resolution of the wavelength variable interference filter.

Figures 4, 5:
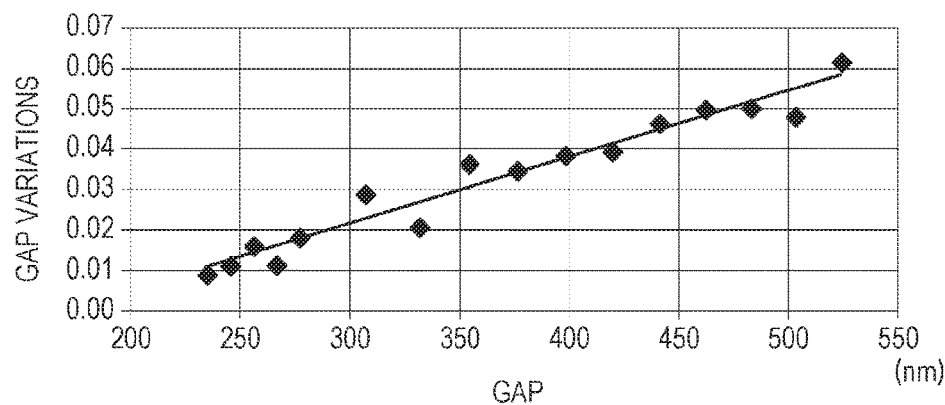
FIG. 4 is a graph that shows a relationship between the dimension of the gap between the fixed reflection film and the movable reflection film and variations in the gap dimension.
FIG. 5 is a table that shows, for each combination of the first center wavelength $\lambda 1$ and the second center wavelength $\lambda 2$, required dimension of the gap between the reflection films that is necessary for allowing light of the minimum wavelength in the target wavelength region to be transmitted through the wavelength variable interference filter as a peak wavelength.

For the reasons described above, preferably, the gap dimension d should be controlled in order to reduce variations in the gap dimension d. FIG. 4 is a graph that shows a relationship between the dimension of the gap between the reflection films 54 and 55 and variations in the gap dimension at the time of feedback (actual measurement values). As can be seen from FIG. 4 and the formula (3), it is possible to reduce variations in the gap dimension by decreasing the dimension of the gap between the reflection films 54 and 55.

The reflection characteristics of the fixed reflection film 54 and the movable reflection film 55 according to the present embodiment are set on the basis of the wavelength region (target wavelength region) of light going out of (transmitted through) the wavelength variable interference filter 5. That is, the wavelength variable interference filter 5 spectrally separates, from incident light that comes in, light of plural wavelengths included in the target wavelength region, and allows the separated light to pass through itself.

The target wavelength region is set appropriately depending on an apparatus to which the wavelength variable interference filter 5 is applied (for example, a spectral apparatus). Therefore, the wavelength variable interference filter 5 is required to have spectral characteristics that ensure that light of each wavelength included in the target wavelength region will be outputted at high resolution (narrow half-value width). One of factors that determine spectral characteristics is the optical characteristics (reflection characteristics) of the fixed reflection film 54 and the movable reflection film 55.

The reflection characteristics of the fixed reflection film 54 and the movable reflection film 55 will now be explained. In the following description, a case where the target wavelength region of light separated by the wavelength variable interference filter 5 is from 1100 to 1200 nm and where the gap dimension is scanned to output light of each wavelength at intervals of 10 nm, for example, is taken as an example. FIG. 5 is a table that shows, for each combination of a peak center wavelength (first center wavelength $\lambda 1$) in the reflection characteristics of the movable reflection film 55 and a peak center wavelength (second center wavelength $\lambda 2$) in the reflection characteristics of the fixed reflection film 54, required dimension of the gap between the reflection films 54 and 55 that is necessary for allowing light of the minimum wavelength (=1100 nm) in the target wavelength region to be transmitted through the wavelength variable interference filter 5 as a peak wavelength (minimum gap dimension). FIG. 6 is a table that shows, for each combination of the first center wavelength $\lambda 1$ and the second center wavelength $\lambda 2$, required dimension of the gap between the reflection films 54 and 55 that is necessary for allowing light of the maximum wavelength (=1200 nm) in the target wavelength region to be transmitted through the wavelength variable interference filter 5 as a peak wavelength (maximum gap dimension). FIG. 7 is a table that shows, for each combination of the first center wavelength $\lambda 1$ and the second center wavelength $\lambda 2$, the minimum value of the half-value width of transmitted light passing through the wavelength variable interference filter 5. FIG. 8 is a table that shows, for each combination of the first center wavelength $\lambda 1$ and the second center wavelength $\lambda 2$, the maximum value of the half-value width of transmitted light passing through the wavelength variable interference filter 5. FIG. 9 is a table that shows, for each combination of the first center wavelength $\lambda 1$ and the second center wavelength $\lambda 2$, the minimum value of the transmittance of transmitted light passing through the wavelength variable interference filter 5. FIG. 10 is a table that shows, for each combination of the first center wavelength $\lambda 1$ and the second center wavelength $\lambda 2$, the maximum value of the transmittance of transmitted light passing through the wavelength variable interference filter 5. FIG. 11 is a table that shows, for each combination of the first center wavelength $\lambda 1$ and the second center wavelength $\lambda 2$, a drive amount when wavelength scanning is performed for the target wavelength region. That is, it is the difference between the maximum gap and the minimum gap.

Let $\lambda 1$ be the first center wavelength, which is the peak center wavelength in the reflection characteristics of the movable reflection film 55. Let $\lambda 2$ be the second center wavelength, which is the peak center wavelength in the reflection characteristics of the fixed reflection film 54. Let $d\alpha(\lambda 1, \lambda 2)$ be the dimension of the gap G when light of a first wavelength $\lambda\alpha$ is outputted from the wavelength variable interference filter 5. In a case where light of arbitrary wavelengths included in the target wavelength region is outputted from the wavelength variable interference filter 5 in the same order, the dimension of the gap between the reflection films 54 and 55 is the smallest (minimum gap ds($\lambda 1$, $\lambda 2$)) when light of the minimum wavelength $\lambda$s (=1100 nm) in the target wavelength region is outputted. The dimension of the gap between the reflection films 54 and 55 is the largest (maximum gap dl($\lambda 1$, $\lambda 2$)) when light of the maximum wavelength $\lambda 1$ (=1200 nm) in the target wavelength region is outputted.

Consider a case where light of the minimum wavelength $\lambda$s (=1100 nm) in the target wavelength region is outputted. As illustrated in FIG. 5, if the first center wavelength $\lambda 1$ and the second center wavelength $\lambda 2$ are set into a measurement center wavelength $\lambda 0$, the dimension of the gap G (the minimum gap ds($\lambda 0$, $\lambda 0$)) is 314.4 nm when light of the minimum wavelength $\lambda$s in the target wavelength region is transmitted from the wavelength variable interference filter 5. In all cases where the combination ($\lambda 1$, $\lambda 2$) of the first center wavelength $\lambda 1$ and the second center wavelength $\lambda 2$ is (1050, 1350), (1150, 1250), (1150, 1350), (1250, 1250), (1250, 1350), and (1350, 1350) (unit: nm), the minimum gap ds($\lambda 1$, $\lambda 2$) is less than ds($\lambda 0$, $\lambda 0$).

Since there is a proportional relationship between the transmission wavelength of transmitted light passing through the wavelength variable interference filter 5 and the gap dimension as described earlier, the same holds true in a case where light of the maximum wavelength $\lambda 1$ (=1200 nm) in the target wavelength region is transmitted. That is, as illustrated in FIG. 6, if the first center wavelength $\lambda 1$ and the second center wavelength $\lambda 2$ are set into the measurement center wavelength $\lambda 0$, the dimension of the gap G (the maximum gap dl($\lambda 0$, $\lambda 0$)) is 469.8 nm when light of the maximum wavelength $\lambda 1$ in the target wavelength region is transmitted from the wavelength variable interference filter 5. In all cases where the combination ($\lambda 1$, $\lambda 2$) is (1050, 1350), (1150, 1250), (1150, 1350), (1250, 1250), (1250, 1350), and (1350, 1350), the maximum gap dl($\lambda 1$, $\lambda 2$) is less than dl($\lambda 0$, $\lambda 0$).

In the above combinations ($\lambda 1$, $\lambda 2$)=(1050, 1350), (1150, 1250), (1150, 1350), (1250, 1250), (1250, 1350), and (1350, 1350), half-value width and transmittance are studied below. In a case where the transmittance of each of the reflection films 54 and 55 in the wavelength variable interference filter 5 is high, a part of incident light passes through the wavelength variable interference filter 5 and, therefore, resolution decreases (half-value width decreases). If the first center wavelength $\lambda 1$ and the second center wavelength $\lambda 2$ are set into the measurement center wavelength $\lambda 0$, the minimum transmittance is 0.53 as illustrated in FIG. 9, and the maximum transmittance is 0.58 as illustrated in FIG. 10. If the first center wavelength $\lambda 1$ and the second center wavelength $\lambda 2$ are set into the measurement center wavelength $\lambda 0$, the minimum half-value width is 6.0 nm as illustrated in FIG. 7, and the maximum half-value width is 7.8 nm as illustrated in FIG. 8. In a case of the scanning of each wavelength in the target wavelength region at intervals of 10 nm, it is preferred that half-value width also should be set to be less than 10 nm. In a case where the first center wavelength $\lambda 1$ and the second center wavelength $\lambda 2$ are set into the measurement center wavelength $\lambda 0$, as mentioned above, half-value width is less than 10 nm, from which it can be concluded that the required resolution of the wavelength variable interference filter 5 is fully satisfied. Among the above combinations ($\lambda 1$, $\lambda 2$), as illustrated in FIGS. 7 to 10, in a case of ($\lambda 1$, $\lambda 2$)=(1350, 1350), the maximum value of transmittance is great, and the maximum value of half-value width is greater than 10 nm. Therefore, among the above combinations ($\lambda 1$, $\lambda 2$), it can be concluded that preferred combinations are: (1050, 1350), (1150, 1250), (1150, 1350), (1250, 1250), and (1250, 1350).

As can be concluded from the above study, the combination ($\lambda 1$, $\lambda 2$) that suppresses a decrease in measurement precision due to a decrease in the resolution of the wavelength variable interference filter 5 and best improves driving reproducibility when feedback control is applied to the electrostatic actuator 56 is (1250, 1350). In this case, as illustrated in FIG. 11, the drive amount when the dimension of the gap between the reflection films 54 and 55 is driven from the maximum gap dl to the minimum gap ds is also the smallest among the above combinations ($\lambda 1$, $\lambda 2$). Therefore, a small amount of change in the driving voltage is sufficient when the dimension of the gap between the reflection films 54 and 55 is controlled, and the vibration of the movable region 521 at the time of the gap change is also reduced. The reduction in the vibration of the movable region 521 makes the time taken for the dimension of the gap between the reflection films 54 and 55 to become equal to desired target dimension shorter. In other words, it is possible to shorten the waiting time taken for the wavelength variable interference filter 5 to become able to transmit light of the target wavelengths. In the present embodiment, $\lambda 1 < \lambda 2$. In a case where the center wavelength of reflection characteristics of a dielectric multilayer film is defined as $\lambda$, it is possible to form the defined dielectric multilayer film by setting the thickness "a" of each layer to be: a=$\lambda$/4n (where n is the index of refraction of each layer). Therefore, in the case of $\lambda 1 < \lambda 2$, the film thickness of the movable reflection film 55 is less than the film thickness of the fixed reflection film 54. In the present embodiment, the movable substrate 52 has a structure in which the movable region 521 sags toward the fixed substrate 51. Because of this structure, the movable substrate 52 is more affected by membrane stress when the film is formed than the fixed substrate 51. Since $\lambda 1 < \lambda 2$ as described above, as compared with a case where, for example, $\lambda 1$=1350 nm and $\lambda 2$=1250 nm, it is possible to make the movable substrate 52 less susceptible to the effect of membrane stress, thereby suppressing substrate deformation caused by the stress.

Figure 12:
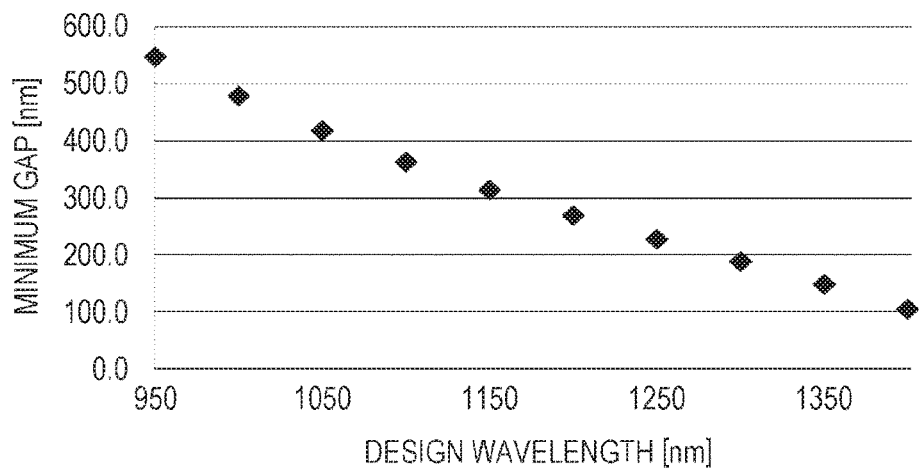
FIG. 12 is a graph that shows required minimum dimension of the gap between the reflection films that is necessary for allowing light of the minimum wavelength in the target wavelength region to be transmitted through the wavelength variable interference filter as a peak wavelength, for the first center wavelength (the second center wavelength), in a case where the value of the second center wavelength is the same as the value of the first center wavelength.

FIG. 12 is a graph that shows required dimension of the gap between the reflection films 54 and 55 that is necessary for allowing light of the minimum wavelength (=1100 nm) in the target wavelength region to be transmitted through the wavelength variable interference filter 5 as a peak wavelength (minimum gap dimension) in a case where the value of the second center wavelength $\lambda 2$ is the same as the value of the first center wavelength $\lambda 1$. In the invention, the peak center wavelength in the reflection characteristics of the movable reflection film 55 may be set to be the same as the peak center wavelength in the reflection characteristics of the fixed reflection film 54. As can be seen from FIG. 12, the longer the peak center wavelength is, the smaller the minimum gap ds($\lambda 1$, $\lambda 2$) is. In this case, if $\lambda 1$=$\lambda 2$=1350 nm, half-value width will be in excess of scan interval when the target wavelength region is scanned at intervals of 10 nm. Therefore, preferably, it should be set as: $\lambda 1$=$\lambda 2$=1250 nm. In a case of greater scan interval, for example, 20 nm, it may be set as, for example: $\lambda 1$=$\lambda 2$=1350 nm, or longer peak center wavelength may be set.

Method of Designing and Manufacturing Wavelength Variable Interference Filter

Next, a method of designing and manufacturing the wavelength variable interference filter described above will now be explained.

Design Method

Figure 13:
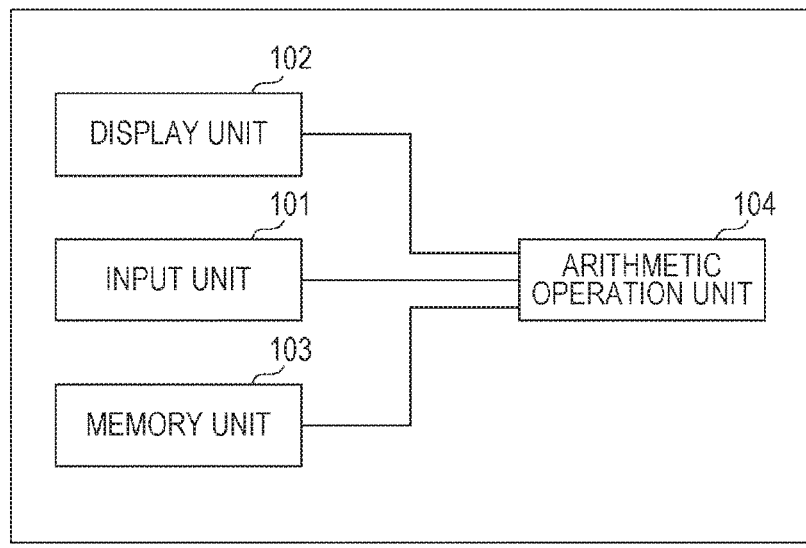
FIG. 13 is a schematic view of an example of a design machine.

For designing each of the reflection films 54 and 55 of the wavelength variable interference filter 5, preferably, for example, a simulation regarding filter characteristics should be run by using a design machine to design the dimension of each layer in each of the reflection films 54 and 55. A general-purpose computer that includes, for example, an input unit 101, a display unit 102, a memory unit 103, an arithmetic operation unit 104, and the like as illustrated in FIG. 13 can be used as the design machine. The input unit 101 inputs, for example, an operation signal in accordance with input operation performed by a user into the arithmetic operation unit 104. The display unit 102 displays an image under the control of the arithmetic operation unit 104. The memory unit 103 stores various kinds of data and programs for designing the wavelength variable interference filter 5. The arithmetic operation unit 104 is made up of, for example, an arithmetic operation circuit such as a CPU (Central Processing Unit), a storing circuit such as a memory, and the like. The arithmetic operation unit 104 reads out various programs stored in the memory unit 103 and runs the read programs.

Figure 14:
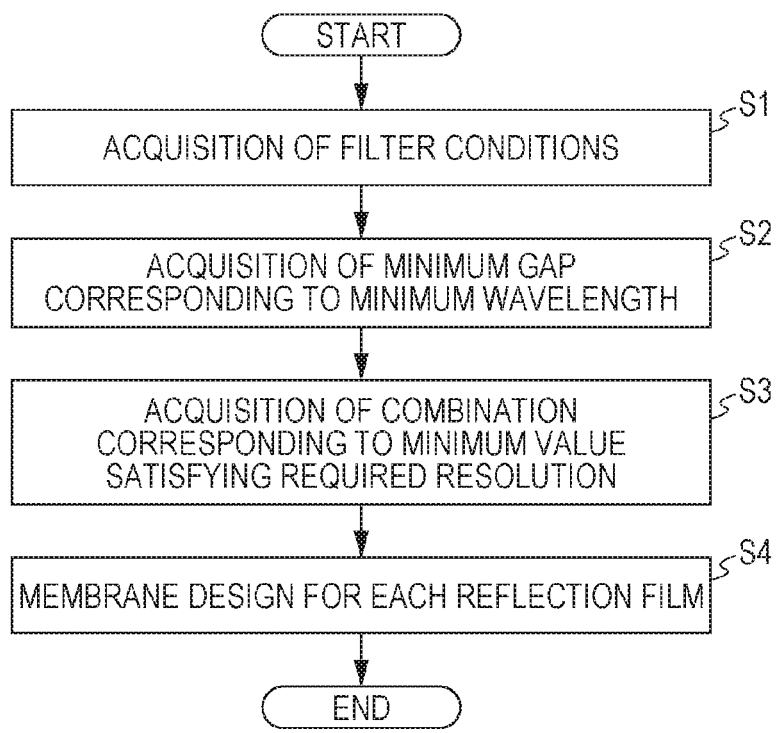
FIG. 14 is a flowchart that illustrates a method of designing a wavelength variable interference filter according to the first embodiment.

FIG. 14 is a flowchart that illustrates a method of designing a wavelength variable interference filter according to the present embodiment. To design the wavelength variable interference filter 5, first, filter conditions that are required in the wavelength variable interference filter 5 are acquired (step S1). The filter conditions are, for example, inputted from the input unit 101. The filter conditions include the target wavelength region of light that is to be spectrally separated in the wavelength variable interference filter 5, scan interval when wavelength scanning is performed, and the like.

After that, within a predetermined wavelength range the center of which is the measurement center wavelength $\lambda 0$ in the target wavelength region, the arithmetic operation unit 104 sets the combinations ($\lambda 1$, $\lambda 2$) of the first center wavelength $\lambda 1$ and the second center wavelength $\lambda 2$. Then, for each of these combinations ($\lambda 1$, $\lambda 2$), the arithmetic operation unit 104 calculates, by performing simulation processing, the minimum gap ds($\lambda 1$, $\lambda 2$) and the maximum value of half-value width when light of the minimum wavelength $\lambda s$ in the target wavelength region is transmitted from the wavelength variable interference filter 5 (step S2). For example, simulation results illustrated in FIGS. 5 and 8 are outputted.

Next, from the calculated maximum values of half-value width in the simulation results, the arithmetic operation unit 104 extracts combinations ($\lambda 1$, $\lambda 2$) in which half-value width is less than the scan interval included in the filter conditions. Then, from the extracted combinations ($\lambda 1$, $\lambda 2$), the arithmetic operation unit 104 acquires the combination ($\lambda 1$, $\lambda 2$) for which the minimum gap ds ($\lambda 1$, $\lambda 2$) is the smallest (step S3).

After that, on the basis of the acquired $\lambda 1$ and $\lambda 2$, the arithmetic operation unit 104 prepares a membrane design for each of the fixed reflection film 54 and the movable reflection film 55 (step S4). That is, the arithmetic operation unit 104 calculates the thickness of each layer in a dielectric multilayer film, of which each of the reflection films 54 and 55 is made. For example, the thickness $d_{1H}$ of the high refractive layer 55A of the movable reflection film 55 can be calculated by using the index of refraction $n_H$ of the high refractive layer 55A ($n_H$ is approximately equal to 3.5 in a case of Si) and the first center wavelength $\lambda 1$ as expressed by the following formula: $d_{1H}=\lambda 1/4n_H$. The thickness $d_{1L}$ of the low refractive layer 55B of the movable reflection film 55 can be calculated by using the index of refraction $n_L$ of the low refractive layer 55B ($n_L$ is approximately equal to 1.45 in a case of $SiO_2$) and the first center wavelength $\lambda 1$ as expressed by the following formula: $d_{1L}=\lambda 1/4n_L$. Similarly, the thickness $d_{2H}$ of the high refractive layer 54A of the fixed reflection film 54 can be calculated by using the index of refraction $n_H$ of the high refractive layer 54A ($n_H$ is approximately equal to 3.5 in a case of Si) and the second center wavelength $\lambda 2$ as expressed by the following formula: $d_{2H}=\lambda 2/4n_H$. The thickness $d_{2L}$ of the low refractive layer 54B of the fixed reflection film 54 can be calculated by using the index of refraction $n_L$ of the low refractive layer 54B ($n_L$ is approximately equal to 1.45 in a case of $SiO_2$) and the second center wavelength $\lambda 2$ as expressed by the following formula: $d_{2L}=\lambda 2/4n_L$.

Manufacturing Method

Figure 15:
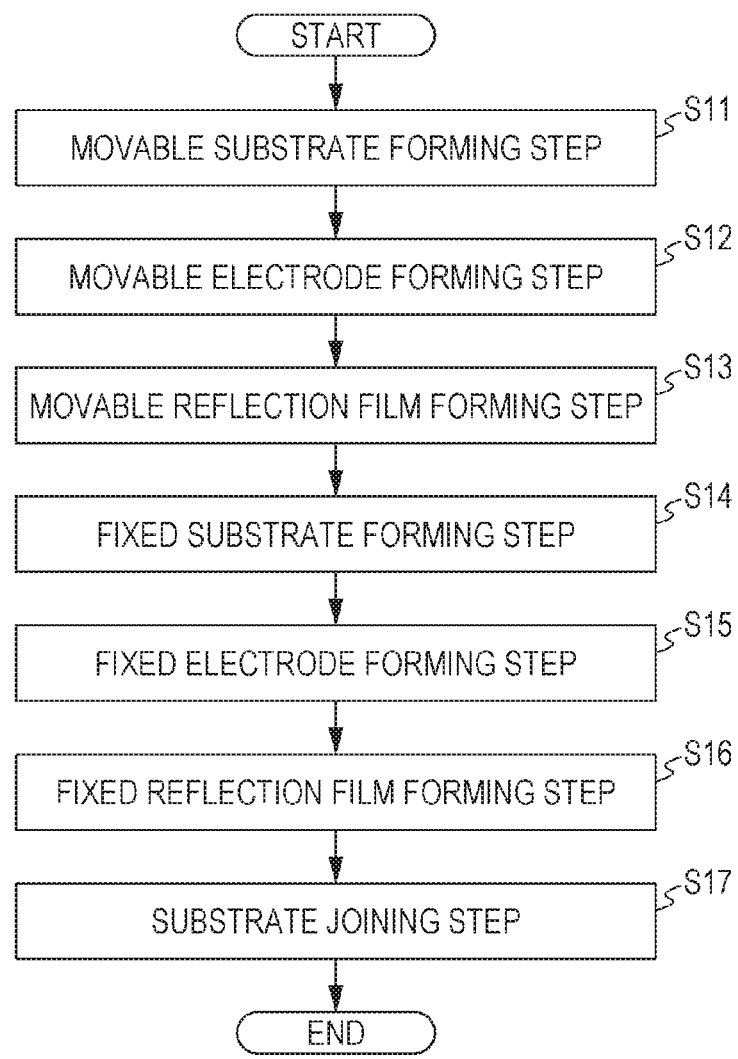
FIG. 15 is a flowchart that illustrates a method of manufacturing a wavelength variable interference filter according to the first embodiment.

FIG. 15 is a flowchart that illustrates a method of manufacturing a wavelength variable interference filter according to the present embodiment. In the manufacture of the wavelength variable interference filter 5, as illustrated in FIG. 15, a movable substrate forming step S11 is executed. The following processing is performed in the step S11. A resist is formed on a glass substrate that is the material of the movable substrate 52 by using a photolithography method. The resist has an opening at a position where the supporting region 522 is to be formed. After the forming of the resist, etching is performed to form the movable region 521 and the supporting region 522. After the etching, the resist is removed. Next, a movable electrode forming step S12 is executed to form the movable electrode 562. The following processing is performed in the step S12. An electrode material is formed on one side (the opposite surface that is not the etching-treated surface) of the movable substrate 52 by using, for example, a deposition method or a sputtering method. Then, a resist is applied onto the electrode material, and the resist is patterned in the shape of the movable electrode 562 and the movable lead-out electrode 564 by using a photolithography method. Etching is performed to pattern the movable electrode 562 and the movable lead-out electrode 564. After the etching, the resist is removed.

After that, a movable reflection film forming step S13 (first step according to the invention) is executed to form the movable reflection film 55. The following processing is performed in the step S13. By using a photolithography method, etc., a resist (lift-off pattern) is formed on the movable substrate 52 except for a region where the movable reflection film 55 is to be formed. Then, the high refractive layers 55A and the low refractive layers 55B are formed in layers for forming the movable reflection film 55. In this process, in accordance with the thickness $d_{1H}$, $d_{1L}$ of each of the layers of the movable reflection film designed (calculated) by using the design method illustrated in FIG. 14, the high refractive layers 55A and the low refractive layers 55B are formed alternately in a predetermined number of layers. The conductive film 55C (for example, an ITO film) is formed as the superficial layer of the dielectric multilayer film. Similarly to the thickness of the high refractive layer 55A and the low refractive layer 55B, the thickness $d_{1e}$ of the conductive film 55C can be calculated by using the index of refraction $n_e$ of the conductive film 55C as expressed by the following formula: $d_{1e}=\lambda 1/4n_e$. After the forming of the layers one on another, an unnecessary part of the membrane stack is removed by lift-off. After that, a film of an electrode material for the second detection electrode 551 is formed and patterned.

Next, a fixed substrate forming step S14 is executed. In the step S14, the electrode providing groove 511 and the reflection film providing region 512 are formed by going through multiple processes of forming a resist on a glass substrate that is the material of the fixed substrate 51 by using a photolithography method and applying etching treatment thereto. After that, a fixed electrode forming step S15 is executed to form the fixed electrode 561 and the fixed lead-out electrode 563. In the step S15, similarly to the step S12, an electrode material is formed on one side (the etching-treated surface) of the fixed substrate 51 by using, for example, a deposition method or a sputtering method, and etching is performed to pattern the fixed electrode 561 and the fixed lead-out electrode 563.

After that, a fixed reflection film forming step S16 (second step according to the invention) is executed to form the fixed reflection film 54. The following processing is performed in the step S16. By using a photolithography method, etc., a resist (lift-off pattern) is formed on the fixed substrate 51 except for a region where the fixed reflection film 54 is to be formed. Then, the high refractive layers 54A and the low refractive layers 54B are formed in layers for forming the fixed reflection film 54. In this process, similarly to the step S13, in accordance with the thickness $d_{aH}$, $d_{2L}$ of each of the layers of the fixed reflection film 54 designed (calculated) by using the design method illustrated in FIG. 14, the high refractive layers 54A and the low refractive layers 54B are formed alternately in a predetermined number of layers. The conductive film 54C is formed as the superficial layer of the dielectric multilayer film. Similarly to the thickness of the high refractive layer 54A and the low refractive layer 54B, the thickness $d_{2e}$ of the conductive film 54C can be calculated by using the index of refraction $n_e$ of the conductive film 54C as expressed by the following formula: $d_{2e}=\lambda 2/4n_e$. After the forming of the layers one on another, an unnecessary part of the membrane stack is removed by lift-off. After that, a film of an electrode material for the first detection electrode 541 is formed and patterned.

After that, the movable substrate 52 manufactured by going through the steps S11, S12, and S13 and the fixed substrate 51 manufactured by going through the steps S14, S15, and S16 are joined to each other (substrate joining step: step 17). In the example illustrated in FIG. 15, the step S13 is executed after the step S12. However, the step S13 may be executed before the step S12 to form the movable reflection film 55 first, followed by execution of the step S12 to form the movable electrode 562 and the movable lead-out electrode 564 next. In this case, when the movable electrode 562 and the movable lead-out electrode 564 are formed in the step S12, it is possible to form the second detection electrode 551 together therewith at the same time. Similar reversal may be applied to the fixed substrate 51. That is, after the forming of the fixed reflection film 54 in the step S16, the fixed electrode 561, the fixed lead-out electrode 563, and the first detection electrode 541 may be formed at the same time in the step S15. In the present embodiment, after the manufacturing of the movable substrate 52 by going through the steps S11, S12, and S13, the fixed substrate 51 is manufactured by going through the steps S14, S15, and S16. However, the steps S11, S12, and S13 may be executed after the steps S14, S15, and S16.

Operational Effects of First Embodiment

The wavelength variable interference filter 5 of the present embodiment includes the fixed reflection film 54, the movable reflection film 55 facing the fixed reflection film 54, and the electrostatic actuator 56, which changes the dimension of the gap between the fixed reflection film and the movable reflection film 55. The peak center wavelength in the reflection characteristics of the movable reflection film 55 and the peak center wavelength in the reflection characteristics of the fixed reflection film 54 satisfy $ds(\lambda 1, \lambda 2)<ds(\lambda 0, \lambda 0)$.

In such a structure, the dimension of the gap between the reflection films 54 and 55 is small when light of wavelengths included in the target wavelength region is outputted from the wavelength variable interference filter 5, and it is possible to reduce variations in the gap dimension when feedback control is performed on the driving voltage applied to the electrostatic actuator 56 (when the dimension of the gap G is controlled). That is, it is possible to improve driving reproducibility in the wavelength variable interference filter 5. This makes it possible to obtain transmitted light of a desired wavelength from the wavelength variable interference filter 5 with high precision and improve the precision in spectral separation performed by the wavelength variable interference filter 5.

In the present embodiment, the peak center wavelength in the reflection characteristics of the fixed reflection film 54 and the peak center wavelength in the reflection characteristics of the movable reflection film 55 are set on the basis of the dimension of the gap G (the minimum gap $ds(\lambda 1, \lambda 2)$) when light of the minimum wavelength $\lambda s$ in the target wavelength region is transmitted from the wavelength variable interference filter 5. In a case where output light goes out of the wavelength variable interference filter 5 in the same order, the gap dimension is the smallest when light of the minimum wavelength $\lambda s$ is outputted. In addition, there is a proportional relationship between the wavelength of transmitted light passing through the wavelength variable interference filter 5 and the dimension of the gap between the reflection films 54 and 55. Therefore, by using the minimum gap corresponding to the minimum wavelength $\lambda s$, it is possible to calculate the first center wavelength $\lambda 1$ and the second center wavelength $\lambda 2$ easily, for example, without any need for checking required gap dimension that is necessary for allowing light of all wavelengths in the target wavelength region to be transmitted therethrough.

In the present embodiment, preferably, the first center wavelength $\lambda 1$ and the second center wavelength $\lambda 2$ should satisfy $\lambda 1 \geq \lambda 0$, and $\lambda 2 > \lambda 0$. As can be seen from FIGS. 5, 6, and 12, the longer the first center wavelength $\lambda 1$ and the second center wavelength $\lambda 2$, the smaller the minimum gap $ds(\lambda 1, \lambda 2)$. Therefore, by satisfying $\lambda 1 \lambda 0$, and $\lambda 2 > \lambda 0$, it is possible to reduce variations in the gap dimension at the time of feedback control of the gap G and to improve driving reproducibility.

In the present embodiment, the fixed reflection film 54 and the movable reflection film 55 are dielectric multilayer films. Therefore, for example, as compared with a case where metal films are used as the fixed reflection film 54 and the movable reflection film 55, it is possible to make the half-value width of transmitted light of the wavelength variable interference filter 5 narrower and realize higher resolution.

In the present embodiment, a relation of $\lambda 1 < \lambda 2$ is met. That is, the thickness of the movable reflection film 55 is less than that of the fixed reflection film 54. This structure makes it possible to reduce membrane stress transmitted from the movable reflection film 55 to the movable substrate 52. In particular, in the present embodiment, the supporting region 522 yields for giving rise to the displacement of the movable region 521 toward the fixed substrate 51, and, as a result of this displacement, the dimension of the gap G is changed. In such a structure, the movable substrate 52 is susceptible to deformation. Therefore, by suppressing the effect of membrane stress as described earlier, it is possible to reduce a decrease in precision in spectroscopic measurement (resolution).

In the present embodiment, when transmitted light is outputted from the wavelength variable interference filter 5 by scanning the wavelengths in the target wavelength region at predetermined wavelength intervals (for example, 10 nm), the first center wavelength λ1 and the second center wavelength λ2 are acquired in such a way that the half-value width of the transmitted light will be less than 10 nm, that is, the wavelength intervals, and the fixed reflection film 54 and the movable reflection film 55 are designed on the basis of the acquired values. Therefore, it is possible to ensure that the half-value width of the transmitted light outputted from the wavelength variable interference filter 5 will be small enough so as not to have any influence on, for example, spectroscopic measurement or the like. Therefore, it is possible to keep high spectral precision.

Second Embodiment

Next, a second embodiment of the invention will now be explained. In the second embodiment, with reference to the accompanying drawings, an example of an electronic device in which the wavelength variable interference filter 5 described above in the first embodiment is built will now be explained.

Schematic Structure of Printer

Figure 16:
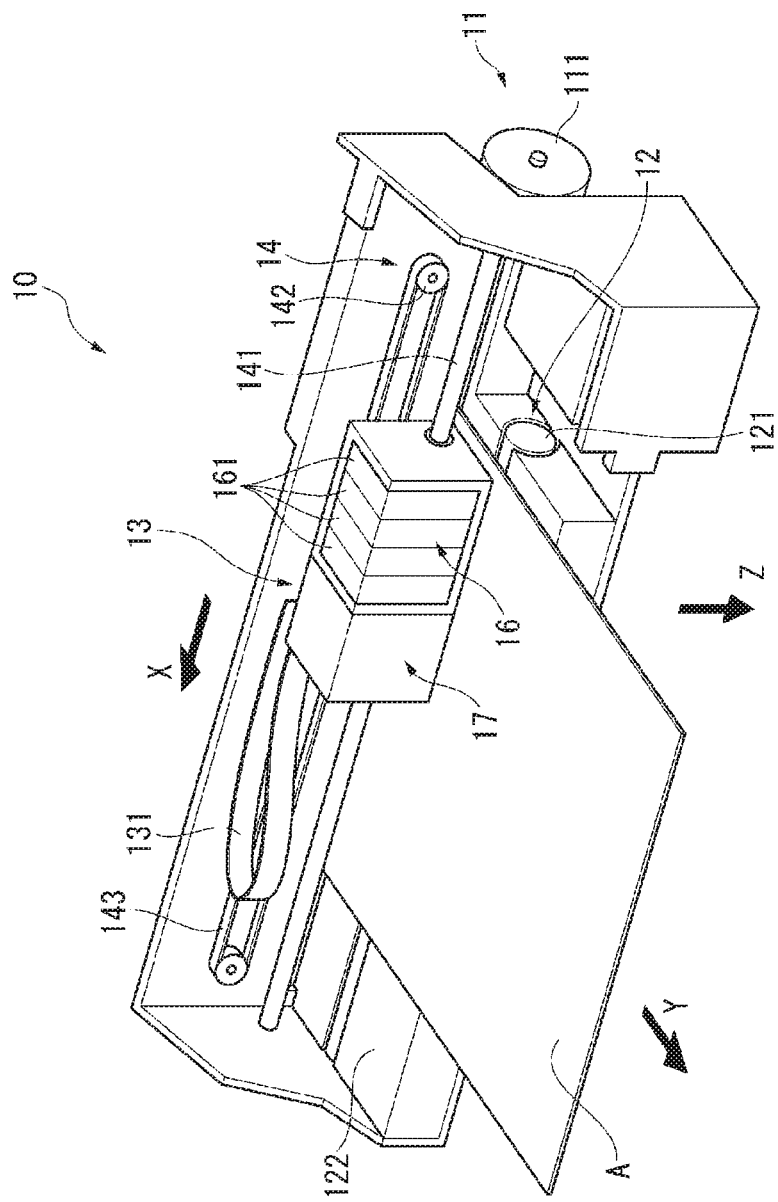
FIG. 16 is a perspective view of the schematic structure of a printer according to a second embodiment.
Figure 17:
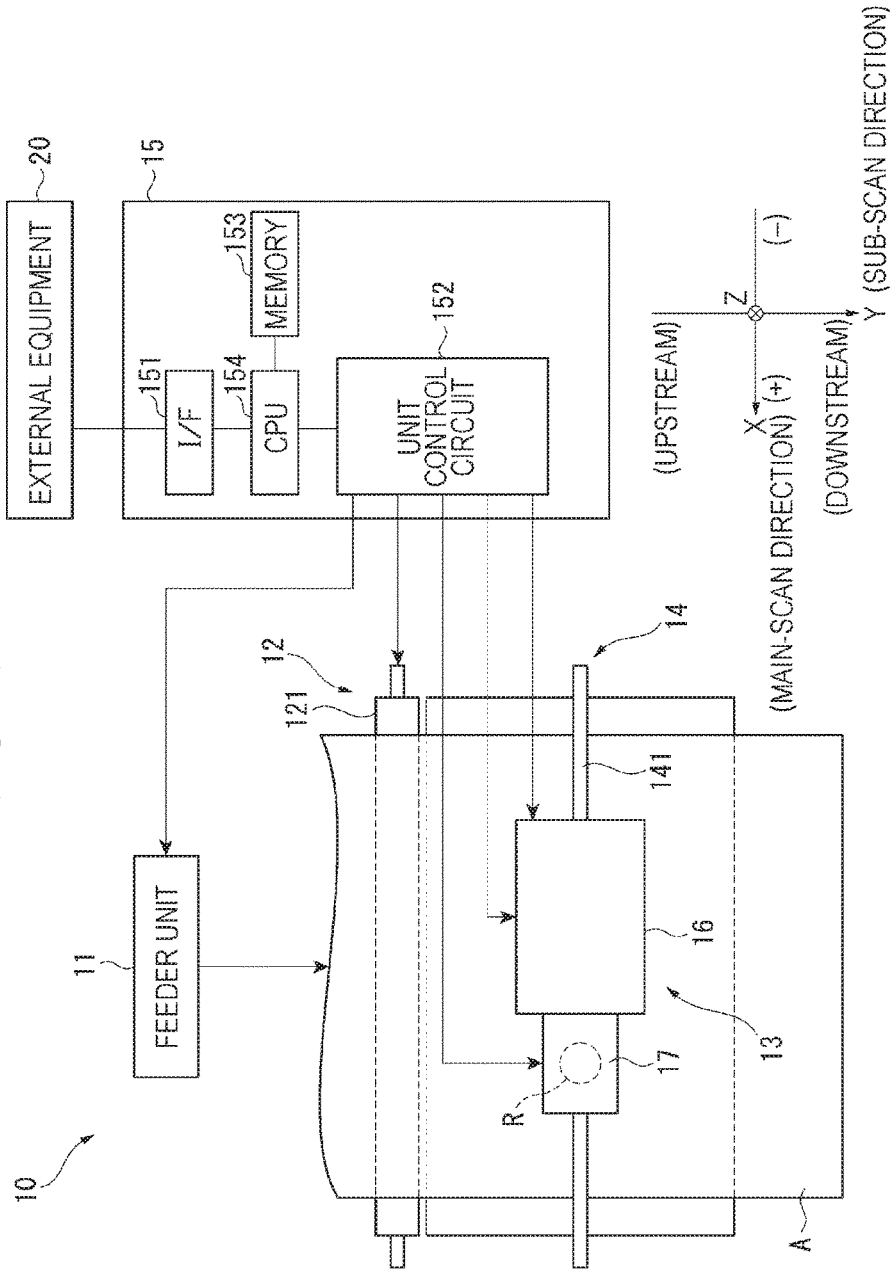
FIG. 17 is a block diagram that illustrates the schematic structure of a printer according to the second embodiment.

FIG. 16 is an external view of an example of the structure of a printer 10 according to a second embodiment. FIG. 17 is a block diagram that illustrates the schematic structure of the printer 10 of the second embodiment. As illustrated in FIG. 16, the printer 10 includes a feeder unit 11, a transportation unit 12, a carriage 13, a carriage movement unit 14, and a control unit 15 (refer to FIG. 17). On the basis of print data inputted from external equipment 20 such as, for example, a personal computer, the printer 10 controls each of the units 11, 12, and 14 and the carriage 13 to print an image on a medium A. The printer 10 of the present embodiment forms a color patch, which is to be used for color measurement (colorimetry), at a predetermined position on the medium A on the basis of preset calibration print data, and performs spectroscopic measurement on the color patch. The printer 10 compares the actual measurement value of the color patch with the calibration print data to judge whether the color print contains any color misregistration or not. In a case where there is color misregistration, the printer 10 performs color correction on the basis of the actual measurement value. Each component of the printer 10 will now be explained in detail.

The feeder unit 11 is a unit that feeds the medium A to an image feeding position. The medium A is the target such as paper onto which an image is to be formed thereat. The feeder unit 11 includes, for example, a roll member 111 (refer to FIG. 16), which is a core for the medium A wound in the form of a roll thereon, a roll drive motor (not illustrated), and a roll drive gear train (not illustrated). On the basis of an instruction given from the control unit 15, the roll drive motor is driven to rotate. The force of rotation of the roll drive motor is transmitted to the roll member 111 via the roll drive gear train. Therefore, the roll member 111 rotates to unreel, and feed, the paper from the roll member 111 toward the downstream side (+Y) in the Y direction (sub-scan direction). In the example described in the present embodiment, the roll paper unreeled from the roll member 111 is fed. However, the scope of the invention is not limited to the example. Any alternative feed method may be adopted to feed the medium A. For example, the medium A that is a stack of sheets on a tray, etc. may be fed by a roller, etc., one sheet after another.

The transportation unit 12 transports the medium A fed from the feeder unit 11 in the Y direction. The transportation unit 12 includes a transportation roller 121, a driven roller (not illustrated), and a platen 122. The driven roller is a follower roller that rotates by being driven by the transportation roller 121. The driven roller is provided at a position where the medium A is to be nipped between the transportation roller 121 and the driven roller itself. The transportation roller 121 is configured to receive a driving force transmitted from a transportation motor that is not illustrated. When the transportation motor is driven under the control of the control unit 15, the transportation roller 121 is driven to rotate due to the force of motor rotation. The medium A is transported in the Y direction in a state of being pinched between the motor-driven roller 121 and the follower roller. The platen 122 facing the carriage 13 is provided downstream of the transportation roller 121 in the Y direction (at the +Y side).

The carriage 13 includes a print unit 16, which prints an image onto the medium A, and a spectroscope 17, which performs spectroscopic measurement at a predetermined measurement position R (refer to FIG. 17) on the medium A. The carriage 13 is configured to be able to move in the main-scan direction intersecting with the Y direction when driven by the carriage movement unit 14. The carriage 13 is connected via a flexible circuit 131 to the control unit 15. On the basis of an instruction given from the control unit 15, print processing by the print unit 16 and spectroscopic measurement processing by the spectroscope 17 are executed. A detailed structure of the carriage 13 will be described later.

The carriage movement unit 14 is an example of a movement mechanism according to the invention. On the basis of an instruction given from the control unit 15, the carriage movement unit 14 causes the carriage 13 to reciprocate. The carriage movement unit 14 includes, for example, a carriage guide shaft 141, a carriage motor 142, and a timing belt 143. The carriage guide shaft 141 extends in the λ direction. Both ends of the carriage guide shaft 141 are fixed to, for example, the housing of the printer 10. The carriage motor 142 drives the timing belt 143. The timing belt 143 is supported substantially in parallel with the carriage guide shaft 141. A part of the carriage 13 is fixed to the timing belt 143. The timing belt 143 travels in the normal direction and in the reverse direction when the carriage motor 142 is driven on the basis of an instruction given from the control unit 15. The carriage 13, which is fixed to the timing belt 143, reciprocates while being guided along the carriage guide shaft 141.

Next, with reference to the accompanying drawings, the structure of the print unit 16 and the spectroscope 17, which are mounted on the carriage 13, will now be explained.

Structure of Print Unit

The print unit 16 forms an image on the medium A by ejecting ink individually onto the medium A at a region where the print unit 16 and the medium A face each other. Plural ink cartridges 161 corresponding to ink of plural colors are detachably mounted on the print unit 16. Ink is supplied from each of the ink cartridges 161 through a tube (not illustrated) to an ink tank (not illustrated). The lower surface (facing the medium A) of the print unit 16 has nozzles (not illustrated), from which ink droplets are ejected. These nozzles correspond to the colors. For example, piezoelectric elements are arranged for these nozzles. As a result of the driving of the piezoelectric elements, ink supplied from the ink tank is ejected in the form of droplets to land onto the surface of the medium A. Dots are formed in this way.

Structure of Spectroscope

Figure 18:
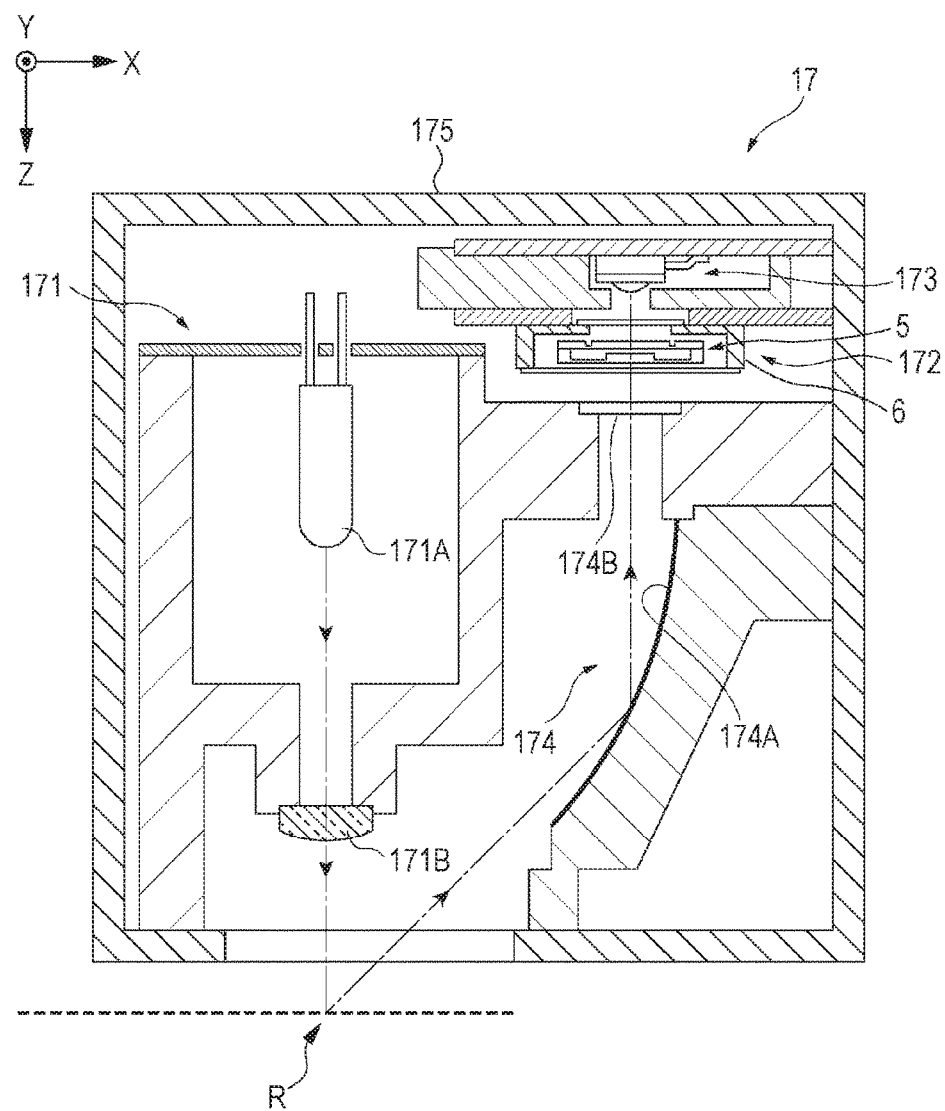
FIG. 18 is a sectional view of the schematic structure of a spectroscope built in a printer according to the second embodiment.

FIG. 18 is a sectional view of the schematic structure of the spectroscope 17. The spectroscope 17 is an example of an optical module according to the invention. As illustrated in FIG. 18, the spectroscope 17 includes a light source unit 171, an optical filter device 172, a light receiving unit 173, a light guiding unit 174, and a housing 175. The spectroscope 17 emits illuminating light from its light source unit 171 to the measurement position R on the medium A. Light components reflected at the measurement position R are guided by the light guiding unit 174 to go into the optical filter device 172. From the reflected light, the optical filter device 172 outputs light of predetermined wavelengths (allows it to pass). The filtered light is received by the light receiving unit 173. The optical filter device 172 is configured to be able to select transmitted wavelengths under the control of the control unit 15. It is possible to perform spectroscopic measurement at the measurement position R on the medium A by measuring the amount of light of each wavelength in the visible light region.

Structure of Light Source Unit

The light source unit 171 includes a light source 171A and a light condenser 171B. The light source unit 171 applies the light emitted from its light source 171A to the measurement position R on the medium A in the direction of a line normal to the surface of the medium A. Preferably, a light source that is capable of emitting light of each wavelength in the visible light region should be used as the light source 171A. For example, a halogen lamp, a xenon lamp, or a white LED, etc. can be used as the light source 171A. Among others, a white LED, which is easy to provide in a limited space inside the carriage 13, is preferred. The light condenser 171B is, for example, a condensing lens. The light condenser 171B has a function of condensing the light coming from the light source 171A onto the measurement position R. The light condenser 171B may be made up of a plurality of lenses, although a single lens (condensing lens) only is illustrated in FIG. 18.

Structure of Optical Filter Device

The optical filter device 172 includes a housing 6. The optical filter device 172 further includes the wavelength variable interference filter 5, which is housed inside the housing 6. The housing 6 has a housing space inside itself. The wavelength variable interference filter 5 is provided inside the housing space. The housing 6 includes a terminal portion that is connected to the fixed lead-out electrode 563, the movable lead-out electrode 564, the first detection electrode 541, and the second detection electrode 551 of the wavelength variable interference filter 5. The terminal portion is connected to the control unit 15. On the basis of an instruction signal supplied from the control unit 15, a predetermined voltage is applied to the electrostatic actuator 56 of the wavelength variable interference filter 5. As a result, light of wavelengths dependent upon the applied voltage is outputted from the wavelength variable interference filter 5. On the basis of signals applied through the first detection electrode 541 and the second detection electrode 551, electrostatic capacitance dependent upon the dimension of the gap between the reflection films 54 and 55 is detected.

Structure of Light Receiving Unit and Light Guiding Optical System

As illustrated in FIG. 18, the light receiving unit 173 is provided on the optical axis of the wavelength variable interference filter 5. The light receiving unit 173 receives light that has passed through the wavelength variable interference filter 5. Under the control of the control unit 15, the light receiving unit 173 outputs a detection signal (current value) that is dependent upon the amount of received light. The detection signal outputted from the light receiving unit 173 is inputted into the control unit 15 through an I-V converter (not illustrated), an amplifier (not illustrated), and an AD converter (not illustrated). The light guiding unit 174 includes a reflecting mirror 174A and a band pass filter 174B. The reflecting mirror 174A of the light guiding unit 174 reflects, onto the optical axis of the wavelength variable interference filter 5, the light reflected at the measurement position R at an angle of 45° with respect to the surface of the medium A. The band pass filter 174B allows light in the visible light region (for example, 380 nm to 720 nm) to pass and cuts off ultraviolet light and infrared light. Therefore, light in the visible light region goes into the wavelength variable interference filter 5, and light of wavelengths selected by the wavelength variable interference filter 5 in the visible light region is received by the light receiving unit 173.

Structure of Control Unit

The control unit 15 is an example of a control unit according to the invention. As illustrated in FIG. 17, the control unit 15 includes an I/F 151, a unit control circuit 152, a memory 153, and a CPU (Central Processing Unit) 154. The I/F 151 is an interface for print data inputted from the external equipment 20 into the CPU 154. The unit control circuit 152 includes a control circuit for controlling each of the feeder unit 11, the transportation unit 12, the print unit 16, the light source 171A, the wavelength variable interference filter 5, the light receiving unit 173, and the carriage movement unit 14. On the basis of an instruction signal supplied from the CPU 154, the unit control circuit 152 controls the operation of each unit. The control circuit for each unit may be provided separately from the control unit 15 and connected to the control unit 15.

Various programs and various kinds of data for controlling the operation of the printer 10 are stored in the memory 153. Various kinds of data mentioned above are, for example, V-λ data that represents the wavelength of transmitted light passing through the wavelength variable interference filter 5 in relation to a voltage applied to the electrostatic actuator 56 when the wavelength variable interference filter 5 is controlled, print profile data that contains the ejection amount of each ink for color data included in print data, and the like. In addition, emission characteristics (emission spectrum) for each wavelength of the light source 171A and receiving characteristics (receiving sensitivity characteristics) for each wavelength of the light receiving unit 173, etc. may be stored therein.

The CPU 154 performs various kinds of control and processing by reading various programs out of the memory 153 and executing them. The control and processing performed by the CPU 154 includes, for example, drive control on the feeder unit 11, the transportation unit 12, and the carriage movement unit 14, print control on the print unit 16, measurement control on the spectroscope 17 (drive control on the electrostatic actuator 56 of the wavelength variable interference filter 5, photoreception control on the light receiving unit 173), color measurement processing based on the result of spectroscopic measurement performed by using the spectroscope 17, and print profile data correction (updating), etc.

Operational Effects of Second Embodiment

The spectroscope 17 of the present embodiment includes the wavelength variable interference filter 5 explained in the first embodiment and the light receiving unit 173 for receiving light that has passed through the wavelength variable interference filter 5. As described earlier, the wavelength variable interference filter 5 is capable of reducing variations in the dimension of the gap G and allowing light of desired wavelengths to pass with high spectral precision. By receiving such high-precision light at the light receiving unit 173, it is possible to perform spectroscopic measurement of a measurement target color patch with high precision.

The printer 10 of the present embodiment performs color measurement processing on a color patch, etc. depending on the result of spectroscopic measurement by the spectroscope 17, and updates print profile data depending on the result of the color measurement. Because of high-precision spectroscopic measurement using the spectroscope 17, it is possible to apply accurate chromaticity measurement to a color patch, and, by updating (correcting) print profile data on the basis of the measurement result, it is possible to faithfully print out a color reproduced by a user onto the medium A by using the print unit 16.

Other Embodiments

The scope of the invention is not limited to the foregoing embodiments. The scope of the invention encompasses various modifications and improvements, etc. introduced within a range in which it is possible to achieve the object of the invention. For example, though the fixed reflection film 54 and the movable reflection film 55 are described as dielectric multilayer films in the foregoing embodiments, the scope of the invention is not limited to such an example. For example, metal films such as Ag films or Ag alloy films, etc. may be used as the fixed reflection film 54 and the movable reflection film 55. In this case, when the material of each of the reflection films 54 and 55 is selected, the steps S1, S2, and S3 in the first embodiment are executed to set an optimum combination ($\lambda 1$, $\lambda 2$) of the peak center wavelength in the reflection characteristics of the reflection film 54 and the peak center wavelength in the reflection characteristics of the reflection film 55. After that, a material (metal film or metal alloy film) corresponding to the combination ($\lambda 1$, $\lambda 2$) is designed.

In the first embodiment described earlier, the minimum wavelength $\lambda s$ is used as the first wavelength $\lambda \alpha$, and the fixed reflection film 54 and the movable reflection film 55 are designed in such a way as to satisfy $ds(\lambda 1, \lambda 2) < ds(\lambda 0, \lambda 0)$ for the gap dimension when light of the minimum wavelength $\lambda s$ is transmitted (the minimum gap $ds(\lambda 1, \lambda 2)$). However, the scope of the invention is not limited to such an example. As described earlier, when light of each wavelength included in the target wavelength region is outputted from the wavelength variable interference filter 5 in the same order, there is a proportional relationship between the wavelength of transmitted light and the gap dimension. Therefore, for example, the first center wavelength $\lambda 1$ and the second center wavelength $\lambda 2$ may be set in such a way as to minimize the dimension of the gap G when light of the maximum wavelength $\lambda 1$ is transmitted from the wavelength variable interference filter 5 (maximum gap).

Though it is described in the foregoing embodiments that light of each wavelength included in the target wavelength region is transmitted from the wavelength variable interference filter 5 in the same order, the order may vary depending on the wavelength region of transmitted light. For example, third-order transmitted light may be used when light in a wavelength range from 1100 nm to 1150 nm is transmitted from the wavelength variable interference filter 5, and second-order transmitted light may be used when light in a wavelength range from 1160 nm to 1200 nm is transmitted from the wavelength variable interference filter 5. In such a case, preferably, the first center wavelength $\lambda 1$ and the second center wavelength $\lambda 2$ should be set on the basis of, for example, the minimum gap corresponding to the third-order minimum wavelength $\lambda s$ (=1100 nm). Let $d_{\lambda 1}$ be the dimension of the gap between the reflection films 54 and 55 in a case where light of a wavelength $\lambda$ is transmitted from the wavelength variable interference filter 5 in Order 1. The dimension of the gap between the reflection films 54 and 55 can be defined as $2d_{\lambda 1}$ in a case where light of the wavelength $\lambda$ is transmitted from the wavelength variable interference filter 5 in Order 2. The dimension of the gap between the reflection films 54 and 55 can be defined as $3d_{\lambda 1}$ in a case where light of the wavelength $\lambda$ is transmitted from the wavelength variable interference filter 5 in Order 3. As can be seen, if the order increases when light of the wavelength $\lambda$ is transmitted, the gap dimension also increases in accordance with the increase in the order. Therefore, when light in the target wavelength region is split in the second or higher order and transmitted, there is a tendency that the gap dimension is large in a high-order transmittance wavelength region, and variations in the gap dimension when feedback control is applied are also great. Therefore, by setting the first center wavelength $\lambda 1$ and the second center wavelength $\lambda 2$ in such a way as to minimize the minimum gap $ds(\lambda 1, \lambda 2)$ corresponding to the minimum wavelength $\lambda s$ in a high-order transmittance wavelength region, it is possible to reduce gap dimension corresponding to each wavelength included in the target wavelength region and to reduce variations in the gap dimension when feedback control is applied.

In the foregoing embodiments, the light-transmissive-type wavelength variable interference filter 5, which spectrally separates, from incident light that comes in, light of predetermined wavelengths, and allows the separated light to pass through itself, is described. However, the scope of the invention is not limited to such an example. For example, a light-reflective-type wavelength variable interference filter that spectrally separates, from incident light that comes in, light of predetermined wavelengths, and reflects the separated light may be used as the wavelength variable interference filter.

In the second embodiment, the printer 10 is described as an example of an electronic device according to the invention. However, the electronic device of the invention can be applied to various electronic devices in various fields. For example, the electronic device of the invention may be applied to a light-based system for detecting the existence of a specific substance. Examples of such a system are: a vehicle-mounted gas leak detector for detecting specific gas with high precision by employing a spectroscopic measurement method using an optical module according to the invention, and a gas detection apparatus such as a photoacoustic rare gas detector for inspection of exhaled air. Another example of a system for detecting the existence of a specific substance is a substance ingredient analyzer such as an apparatus for non-invasive measurement of sugars by using near-infrared spectroscopy or a non-invasive measurement apparatus for obtaining information on food, a living body, a mineral, or the like. In another example, it is possible to transmit data by means of light of each wavelength by changing the intensity of the light of each wavelength over time. In such a case, it is possible to extract data transmitted by means of light of a specific wavelength by spectrally separating the light of the specific wavelength by means of the wavelength variable interference filter and receiving the separated light at the light receiving unit. It is also possible to perform optical communication by processing the data of light of each wavelength by means of such an electronic device. The invention may be applied to, as another example of an electronic device, a spectroscopic camera that captures a spectroscopic image by spectrally separating light by means of the wavelength variable interference filter 5, a spectroscopic analyzer, or the like.

A specific structure for embodying the invention may be modified into other structure, etc. within a range in which it is possible to achieve the object of the invention.

The entire disclosure of Japanese Patent Application No. 2015-200276, filed Oct. 8, 2015 is expressly incorporated by reference herein.

What is claimed is:

1. A wavelength variable interference filter capable of changing a wavelength of output light within a predetermined wavelength region, comprising:
    a first reflection film;
    a second reflection film facing the first reflection film; and
    a gap changing unit that changes dimension of a gap between the first reflection film and the second reflection film,
    wherein a wavelength of the output light is defined as first wavelength $\lambda\alpha$,
    wherein a center wavelength in the predetermined wavelength region is defined as measurement center wavelength $\lambda 0$,
    wherein a peak center wavelength in reflection characteristics of the first reflection film is defined as first center wavelength $\lambda 1$,
    wherein a peak center wavelength in reflection characteristics of the second reflection film is defined as second center wavelength $\lambda 2$,
    wherein the dimension of the gap between the first reflection film and the second reflection film in a case where light of the first wavelength $\lambda\alpha$ is outputted from the wavelength variable interference filter is defined as $d\alpha(\lambda 1, \lambda 2)$,
    wherein, in a case where two optical films that make up a pair are provided in such a way as to face each other, where a center wavelength in reflection characteristics of the pair is the measurement center wavelength $\lambda 0$, and where the light of the first wavelength $\lambda\alpha$ is outputted, dimension of a gap between the two optical films making up the pair is defined as $d\alpha(\lambda 0, \lambda 0)$,
    wherein $d\alpha(\lambda 1, \lambda 2) < d\alpha(\lambda 0, \lambda 0)$ is satisfied, and
    wherein the first center wavelength $\lambda 1$ and the second center wavelength $\lambda 2$ satisfy $\lambda 1 \geq \lambda 0$, and $\lambda 2 > \lambda 0$, and the first center wavelength $\lambda 1$ and the second center wavelength $\lambda 2$ satisfy $\lambda 1 < \lambda 2$.

2. The wavelength variable interference filter according to claim 1, wherein the first wavelength $\lambda\alpha$ is a minimum wavelength in the predetermined wavelength region.

3. The wavelength variable interference filter according to claim 1, wherein the first reflection film and the second reflection film are dielectric multilayer films.

4. The wavelength variable interference filter according to claim 3, further comprising:
    a first substrate on which the first reflection film is formed, and
    wherein the gap changing unit changes the dimension of the gap by giving rise to displacement of the first substrate toward the second reflection film.

5. An electronic device, comprising:
    the wavelength variable interference filter according to claim 1; and
    a control unit that controls the wavelength variable interference filter.

6. An electronic device, comprising:
    the wavelength variable interference filter according to claim 2; and
    a control unit that controls the wavelength variable interference filter.

7. An electronic device, comprising:
    the wavelength variable interference filter according to claim 3; and
    a control unit that controls the wavelength variable interference filter.

8. An electronic device, comprising:
    the wavelength variable interference filter according to claim 4; and
    a control unit that controls the wavelength variable interference filter.

9. The wavelength variable interference filter according to claim 3, wherein the dielectric multilayer films are formed of alternating layers of Si and $SiO_2$.

10. A method of designing a wavelength variable interference filter, the wavelength variable interference filter being capable of changing a wavelength of output light within a predetermined wavelength region and including a first reflection film, a second reflection film facing the first reflection film, and a gap changing unit that changes dimension of a gap between the first reflection film and the second reflection film, comprising:
    designing the first reflection film and the second reflection film;
    wherein a wavelength of the output light is defined as first wavelength $\lambda\alpha$,
    wherein a center wavelength in the predetermined wavelength region is defined as measurement center wavelength $\lambda 0$,
    wherein a peak center wavelength in reflection characteristics of the first reflection film is defined as first center wavelength $\lambda 1$,
    wherein a peak center wavelength in reflection characteristics of the second reflection film is defined as second center wavelength $\lambda 2$,
    wherein the dimension of the gap between the first reflection film and the second reflection film in a case where light of the first wavelength $\lambda\alpha$ is outputted from the wavelength variable interference filter is defined as $d\alpha(\lambda 1, \lambda 2)$,
    wherein, in a case where two optical films that make up a pair are provided in such a way as to face each other, where a center wavelength in reflection characteristics of the pair is the measurement center wavelength $\lambda 0$, and where the light of the first wavelength $\lambda\alpha$ is outputted, dimension of a gap between the two optical films making up the pair is defined as $d\alpha(\lambda 0, \lambda 0)$,
    wherein the first reflection film and the second reflection film are designed in such a way that the first center wavelength $\lambda 1$ and the second center wavelength $\lambda 2$ satisfy $d\alpha(\lambda 1, \lambda 2) < d\alpha(\lambda 0, \lambda 0)$, and
    wherein the first center wavelength $\lambda 1$ and the second center wavelength $\lambda 2$ satisfy $\lambda 1 \geq \lambda 0$, and $\lambda 2 > \lambda 0$, and the first center wavelength $\lambda 1$ and the second center wavelength $\lambda 2$ satisfy $\lambda 1 < \lambda 2$.

11. The method of claim 10, wherein the first reflection film and the second reflection film are dielectric multilayer films, and the dielectric multilayer films are formed of alternating layers of Si and $SiO_2$.

12. A method of manufacturing a wavelength variable interference filter, the wavelength variable interference filter being capable of changing a wavelength of output light within a predetermined wavelength region and including a first reflection film, a second reflection film facing the first reflection film, and a gap changing unit that changes dimension of a gap between the first reflection film and the second reflection film, comprising:
- a first process of forming the first reflection film; and
- a second process of forming the second reflection film,
- wherein a wavelength of the output light is defined as first wavelength $\lambda\alpha$,
- wherein a center wavelength in the predetermined wavelength region is defined as measurement center wavelength $\lambda 0$,
- wherein a peak center wavelength in reflection characteristics of the first reflection film is defined as first center wavelength $\lambda 1$,
- wherein a peak center wavelength in reflection characteristics of the second reflection film is defined as second center wavelength $\lambda 2$,
- wherein the dimension of the gap between the first reflection film and the second reflection film in a case where light of the first wavelength $\lambda\alpha$ is outputted from the wavelength variable interference filter is defined as $d\alpha(\lambda 1, \lambda 2)$,
- wherein, in a case where two optical films that make up a pair are provided in such a way as to face each other, where a center wavelength in reflection characteristics of the pair is the measurement center wavelength $\lambda 0$, and where the light of the first wavelength $\lambda\alpha$ is outputted, dimension of a gap between the two optical films making up the pair is defined as $d\alpha(\lambda 0, \lambda 0)$,
- wherein, in the first process, the first reflection film is manufactured in such a way that the first center wavelength $\lambda 1$ satisfies $d\alpha(\lambda 1, \lambda 2)<d\alpha(\lambda 0, \lambda 0)$,
- wherein, in the second process, the second reflection film is manufactured in such a way that the second center wavelength $\lambda 2$ satisfies $d\alpha(\lambda 1, \lambda 2)<d\alpha(\lambda 0, \lambda 0)$ and
- wherein the first center wavelength $\lambda 1$ and the second center wavelength $\lambda 2$ satisfy $\lambda 1 \geq \lambda 0$, and $\lambda 2 > \lambda 0$, and the first center wavelength $\lambda 1$ and the second center wavelength $\lambda 2$ satisfy $\lambda 1 < \lambda 2$.

13. The method of claim 12, wherein the first reflection film and the second reflection film are dielectric multilayer films, and the dielectric multilayer films are formed of alternating layers of Si and $SiO_2$.

* * * * *